United States Patent
Stockdale et al.

(10) Patent No.: US 10,986,121 B2
(45) Date of Patent: Apr. 20, 2021

(54) MULTIVARIATE NETWORK STRUCTURE ANOMALY DETECTOR

(71) Applicant: Darktrace Limited, Cambridge (GB)

(72) Inventors: Jack Stockdale, Cambridge (GB); Stephen Casey, Cambridge (GB); Anthony Preston, Berkshire (GB)

(73) Assignee: Darktrace Limited, Cambridge (GB)

( * ) Notice: Subject to any disclaimer, the term of this patent is extended or adjusted under 35 U.S.C. 154(b) by 183 days.

(21) Appl. No.: 16/392,381

(22) Filed: Apr. 23, 2019

(65) Prior Publication Data
US 2020/0244673 A1 Jul. 30, 2020

Related U.S. Application Data

(60) Provisional application No. 62/796,507, filed on Jan. 24, 2019.

(51) Int. Cl.
*H04L 29/06* (2006.01)
*G06N 20/00* (2019.01)
(Continued)

(52) U.S. Cl.
CPC ........... *H04L 63/145* (2013.01); *G06N 20/00* (2019.01); *H04L 43/12* (2013.01);
(Continued)

(58) Field of Classification Search
CPC ............... H04L 63/145; H04L 63/1416; H04L 63/1491; H04L 63/20; H04L 63/1425;
(Continued)

(56) References Cited

U.S. PATENT DOCUMENTS 6,154,844 A  11/2000  Touboul et al.
6,965,968 B1  11/2005  Touboul
(Continued)

FOREIGN PATENT DOCUMENTS

EP   2922268 A1    9/2015
WO   2001031420 A2  5/2001
(Continued)

OTHER PUBLICATIONS

Moriano et al., "Insider Threat Event Detection in User-System Interactions", Proceedings of the 2017 International Workshop on Managing Insider Security Threats, pp. 1-12, October (Year: 2017).*
(Continued)

*Primary Examiner* — Morshed Mehedi
(74) *Attorney, Agent, or Firm* — Rutan & Tucker, LLP

(57) ABSTRACT

A multivariate anomaly detector can detect a cyber-attack using incremental malicious actions distributed across multiple devices in a network. A multivariate anomaly detector can collect input data describing communication connections between devices in the network. The multivariate anomaly detector can group the input data into a graph data batch based on a fixed batch increment of time to identify incremental actions. The multivariate anomaly detector can calculate a multivariate centrality score for two or more devices based on the graph data batch describing device centrality to the network. The multivariate anomaly detector can identify whether the two or more devices are in an anomalous state from normal device network interactions based on the multivariate centrality score to identify malicious activity distributed across multiple devices in the network. The multivariate anomaly detector can identify a cyber-attack upon identifying the incremental malicious actions distributed across multiple devices in the network.

20 Claims, 18 Drawing Sheets

(51) Int. Cl.
*H04L 12/26* (2006.01)
*H04L 12/24* (2006.01)

(52) U.S. Cl.
CPC ...... *H04L 63/1416* (2013.01); *H04L 63/1425* (2013.01); *H04L 63/1433* (2013.01); *H04L 63/1491* (2013.01); *H04L 63/20* (2013.01); *H04L 41/22* (2013.01)

(58) Field of Classification Search
CPC ..... H04L 43/12; H04L 63/1433; H04L 41/22; H04L 43/0876; H04L 43/045; H04L 41/14; H04L 41/16; G06N 20/00
See application file for complete search history.

(56) References Cited

U.S. PATENT DOCUMENTS

| | | | |
|---|---|---|---|
| 7,307,999 B1 | 12/2007 | Donaghey | |
| 7,418,731 B2 | 8/2008 | Touboul | |
| 7,448,084 B1 | 11/2008 | Apap et al. | |
| 8,312,540 B1 | 11/2012 | Kahn et al. | |
| 8,819,803 B1 | 8/2014 | Richards et al. | |
| 8,879,803 B2 | 11/2014 | Ukil et al. | |
| 8,966,036 B1 | 2/2015 | Asgekar et al. | |
| 9,043,905 B1 | 5/2015 | Allen et al. | |
| 9,106,687 B1 | 8/2015 | Sawhney et al. | |
| 9,185,095 B1 | 11/2015 | Moritz et al. | |
| 9,213,990 B2 | 12/2015 | Adjaoute | |
| 9,401,925 B1 | 7/2016 | Guo et al. | |
| 9,516,039 B1 | 12/2016 | Yen et al. | |
| 9,516,053 B1 | 12/2016 | Muddu et al. | |
| 9,641,544 B1 | 5/2017 | Treat et al. | |
| 9,712,548 B2 | 7/2017 | Shmueli et al. | |
| 9,727,723 B1 | 8/2017 | Kondaveeti et al. | |
| 9,754,106 B2 * | 9/2017 | Roundy | H04L 63/1416 |
| 2002/0186698 A1 | 12/2002 | Ceniza | |
| 2003/0070003 A1 | 4/2003 | Chong et al. | |
| 2004/0083129 A1 | 4/2004 | Herz | |
| 2004/0167893 A1 | 8/2004 | Matsunaga et al. | |
| 2005/0065754 A1 | 3/2005 | Schaf et al. | |
| 2007/0118909 A1 | 5/2007 | Hertzog et al. | |
| 2007/0294187 A1 | 12/2007 | Scherrer | |
| 2008/0005137 A1 | 1/2008 | Surendran et al. | |
| 2008/0109730 A1 | 5/2008 | Coffman et al. | |
| 2009/0106174 A1 | 4/2009 | Battisha et al. | |
| 2009/0254971 A1 | 10/2009 | Herz et al. | |
| 2010/0009357 A1 | 1/2010 | Nevins et al. | |
| 2010/0095374 A1 | 4/2010 | Gillum et al. | |
| 2010/0125908 A1 | 5/2010 | Kudo | |
| 2010/0235908 A1 | 9/2010 | Eynon et al. | |
| 2010/0299292 A1 | 11/2010 | Collazo | |
| 2011/0093428 A1 | 4/2011 | Wisse | |
| 2011/0213742 A1 | 9/2011 | Lemmond et al. | |
| 2011/0261710 A1 | 10/2011 | Chen et al. | |
| 2012/0096549 A1 | 4/2012 | Amini et al. | |
| 2012/0137367 A1 | 5/2012 | Dupont et al. | |
| 2012/0209575 A1 | 8/2012 | Barbat et al. | |
| 2012/0210388 A1 | 8/2012 | Kolishchak | |
| 2012/0284791 A1 | 11/2012 | Miller et al. | |
| 2012/0304288 A1 | 11/2012 | Wright et al. | |
| 2013/0091539 A1 | 4/2013 | Khurana et al. | |
| 2013/0198119 A1 | 8/2013 | Eberhardt, III et al. | |
| 2013/0198840 A1 | 8/2013 | Drissi et al. | |
| 2013/0254885 A1 | 9/2013 | Devost | |
| 2014/0007237 A1 | 1/2014 | Wright et al. | |
| 2014/0074762 A1 | 3/2014 | Campbell | |
| 2014/0165207 A1 | 6/2014 | Engel et al. | |
| 2014/0215618 A1 | 7/2014 | Amit | |
| 2014/0325643 A1 | 10/2014 | Bart et al. | |
| 2015/0067835 A1 | 3/2015 | Chari et al. | |
| 2015/0081431 A1 | 3/2015 | Akahoshi et al. | |
| 2015/0161394 A1 | 6/2015 | Ferragut et al. | |
| 2015/0163121 A1 | 6/2015 | Mahaffey et al. | |
| 2015/0172300 A1 | 6/2015 | Cochenour | |
| 2015/0180893 A1 | 6/2015 | Im et al. | |
| 2015/0213358 A1 | 7/2015 | Shelton et al. | |
| 2015/0286819 A1 | 10/2015 | Coden et al. | |
| 2015/0310195 A1 | 10/2015 | Bailor et al. | |
| 2015/0319185 A1 | 11/2015 | Kirti et al. | |
| 2015/0341379 A1 | 11/2015 | Lefebvre et al. | |
| 2015/0363699 A1 | 12/2015 | Nikovski | |
| 2015/0379110 A1 | 12/2015 | Marvasti et al. | |
| 2016/0062950 A1 | 3/2016 | Brodersen et al. | |
| 2016/0078365 A1 | 3/2016 | Baumard | |
| 2016/0149941 A1 | 5/2016 | Thakur et al. | |
| 2016/0164902 A1 | 6/2016 | Moore | |
| 2016/0173509 A1 | 6/2016 | Ray et al. | |
| 2016/0241576 A1 | 8/2016 | Rathod et al. | |
| 2016/0352768 A1 | 12/2016 | Lefebvre et al. | |
| 2016/0373476 A1 | 12/2016 | Dell'Anno et al. | |
| 2017/0063907 A1 | 3/2017 | Muddu et al. | |
| 2017/0063910 A1 | 3/2017 | Muddu et al. | |
| 2017/0063911 A1 | 3/2017 | Muddu et al. | |
| 2017/0169360 A1 | 6/2017 | Veeramachaneni et al. | |
| 2017/0220801 A1 * | 8/2017 | Stockdale | H04L 63/1425 |
| 2017/0230391 A1 | 8/2017 | Ferguson et al. | |
| 2017/0230392 A1 * | 8/2017 | Dean | H04L 63/1425 |
| 2017/0251012 A1 * | 8/2017 | Stockdale | H04L 63/02 |
| 2017/0270422 A1 | 9/2017 | Sorakado | |
| 2018/0027006 A1 | 1/2018 | Zimmermann et al. | |
| 2018/0159881 A1 * | 6/2018 | Crabtree | G06F 21/577 |
| 2018/0167402 A1 | 6/2018 | Scheidler et al. | |
| 2020/0396218 A1 * | 12/2020 | Crabtree | H04L 43/04 |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

* cited by examiner

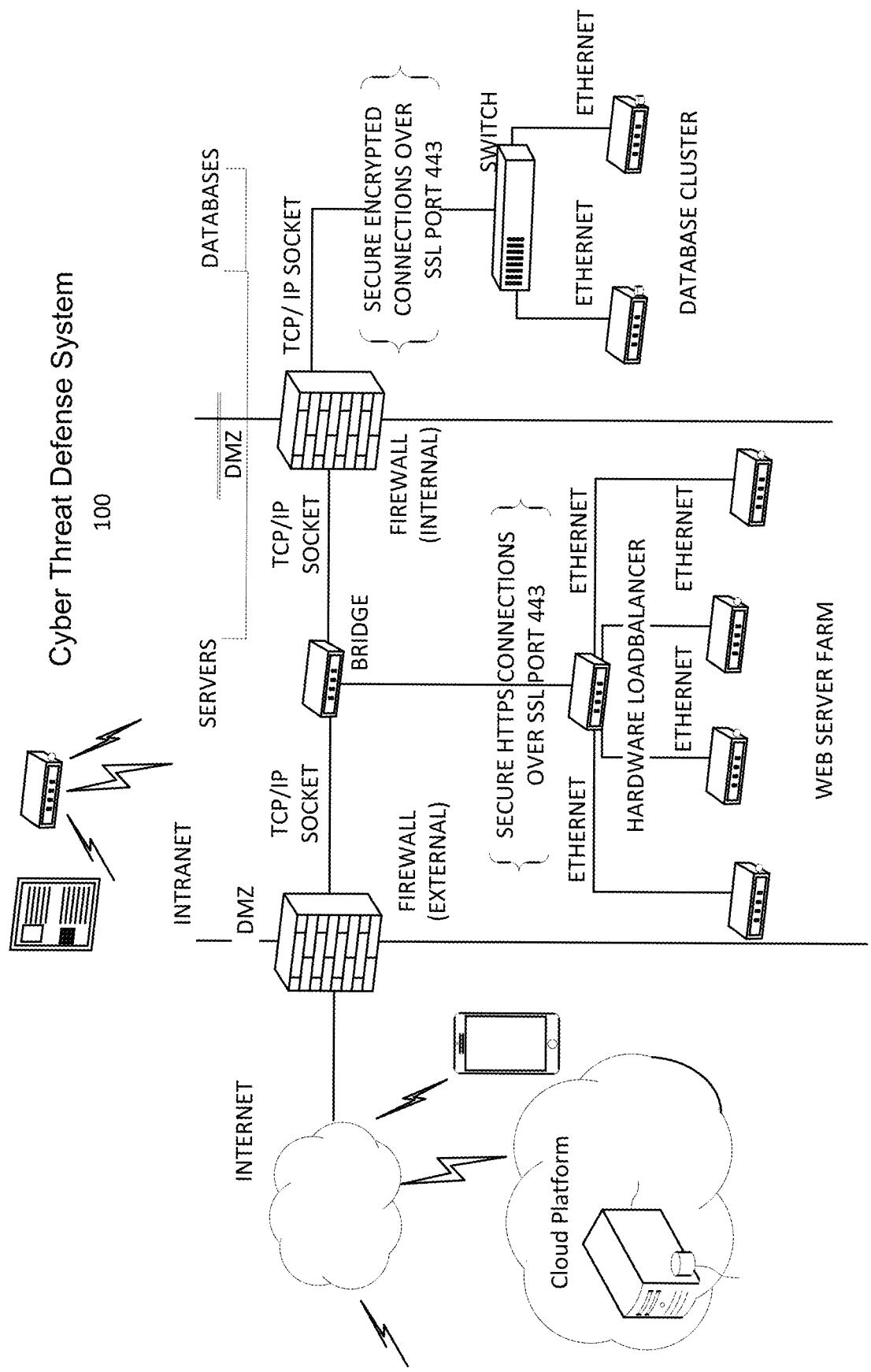
FIG. 18 Network

MULTIVARIATE NETWORK STRUCTURE ANOMALY DETECTOR

RELATED APPLICATION

This application claims priority to and the benefit of under 35 USC 119 of U.S. provisional patent application titled "A Cyber Security System," filed Jan. 24, 2019, Ser. No. 62/796,507, which is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber threat defense system. In an embodiment, a cyber threat defense system may detect a cyber security threat that uses multiple devices for its attack.

BACKGROUND

In the cyber security environment, firewalls, endpoint security methods and other tools such as security information and event management systems (SIEMs) and restricted environments, such as sandboxes, are deployed to enforce specific policies and provide protection against certain threats. These tools currently form an important part of an organization's cyber defense strategy, but they are insufficient in the new age of cyber threat.

A Cyber threat, including email threats, viruses, Trojan horses, and worms, can subtly and rapidly cause harm to a network. Additionally, human users may wreak further damage to the system by malicious action. A cyber security system has to identify each of these cyber threats as they evolve.

SUMMARY

A multivariate anomaly detector can detect a cyber-attack using incremental malicious actions distributed across multiple devices in a network. A multivariate anomaly detector can collect input data describing communication connections between devices in the network. The multivariate anomaly detector can group the input data into a graph data batch based on a fixed batch increment of time to identify incremental actions. The multivariate anomaly detector can calculate a multivariate centrality score for two or more devices based on the graph data batch describing device centrality to the network. The multivariate anomaly detector can identify whether the two or more devices are in an anomalous state from normal device network interactions based on the multivariate centrality score to identify malicious activity distributed across multiple devices in the network. The multivariate anomaly detector can identify a cyber-attack upon identifying incremental malicious actions distributed across multiple devices in the network.

These and other features of the design provided herein can be better understood with reference to the drawings, description, and claims, all of which form the disclosure of this patent application.

DRAWINGS

The drawings refer to some embodiments of the design provided herein in which:

FIG. 18 illustrates a diagram of an embodiment of an example network to be protected by the cyber threat defense system using the multivariate anomaly detector.

Figure 1:
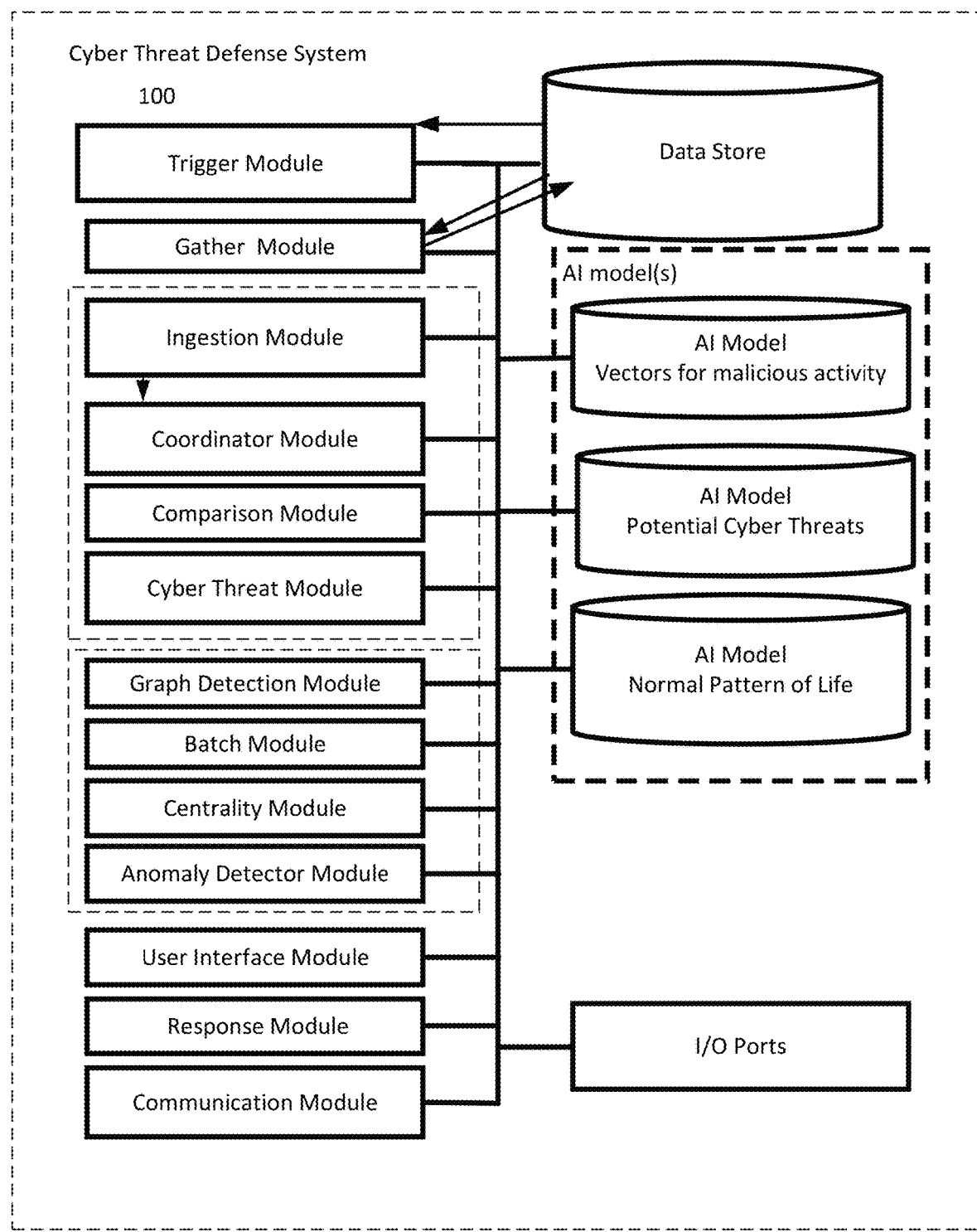
FIG. 1 illustrates a block diagram of an embodiment of a cyber threat defense system with a cyber threat module that references machine-learning models to identify cyber threats by identifying deviations from normal behavior.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the cyber threat defense system may use artificial intelligence to analyze cyber security threats. The detector detects anomalous behavior on two or more nodes. The detector captures and tracks low and slow attacks coming from multiple different devices. The detector looks at unusual activity/anomalous states occurring over two or more (a group) of devices/nodes in order to detect potential cyber threats indicative of a distributed incremental attack.

The multivariate network structure anomaly detector can detect cyber threats trying to hide its activities, such as one that has infected multiple devices in a network and causes its malicious activities to be generated from different devices within the network. The multivariate network structure anomaly detector is not confined to looking at communications from a single device acting oddly in a network. Rather, the multivariate network structure anomaly detector can use mathematical processes and algorithms to detect a distributed cyber threat, such as malware, acting over a group of affected devices.

FIG. 1 illustrates a block diagram of an embodiment of a cyber threat defense system with a cyber threat module that references machine-learning models that are trained on the normal behavior of network activity and user activity associated with a network. The cyber threat module determines a threat risk parameter that factors in 'the likelihood that a chain of one or more unusual behaviors of email activity, network activity, and user activity under analysis fall outside of derived normal benign behavior;' and thus, are likely malicious behavior.

The cyber threat defense system 100 may protect against cyber security threats from an e-mail system or other communication system, as well as its network. The network may be an Information Technology network, an Operational Technology network, a SaaS environment, a Cloud environment, and any combination of these. The cyber threat defense system 100 may include components such as i) a trigger module, ii) a gather module, iii) a data store, iv) an ingestion module, v) a coordinator module, vi) a comparison module, vii) a cyber threat module, viii) a graph detection module, ix) a batch module, x) a centrality processing module, xi) an anomaly detector module, xii) a user interface module, xiii) an autonomous response module, xiv) a communication module, xv) at least one input or output (I/O) port to securely connect to other ports as required, xvi) one or more machine-learning models such as a first Artificial Intelligence model trained on vectors for malicious activity in the network, a second Artificial Intelligence model trained on potential cyber threats, a third Artificial Intelligence model trained on a normal pattern of life for a device in the network, and one or more Artificial Intelligence models each trained on different users, devices, system activities and interactions between entities in the system, and other aspects of the system, as well as xvii) other similar components in the cyber threat defense system. Note, the Artificial Intelligence model trained on known data fields with identified privacy levels used in the network and the Artificial Intelligence model trained on known sensitive data fields and their data can be a single Artificial Intelligence model or separate Artificial Intelligence models.

A trigger module may detect time stamped data indicating one or more i) events and/or ii) alerts from I) unusual or II) suspicious behavior/activity are occurring and then triggers that something unusual is happening. Accordingly, the gather module is triggered by specific events and/or alerts of i) an abnormal behavior, ii) a suspicious activity, and iii) any combination of both. The inline data may be gathered on the deployment from a data store when the traffic is observed. The scope and wide variation of data available in this location results in good quality data for analysis. The collected data is passed to the comparison module and the cyber threat module.

The gather module may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis. A feedback loop of cooperation occurs between the gather module, the ingestion module monitoring network and email activity, the comparison module to apply one or more models trained on different aspects of this process, and the cyber threat module to identify cyber threats based on comparisons by the comparison module. While an email module is an example mentioned, a similar module may be applied to other communication systems, such as text messaging and other possible vectors for malicious activity. Each hypothesis of typical threats can have various supporting points of data and other metrics associated with that possible threat, such as a human user insider attack, inappropriate network behavior, or email behavior or malicious software or malware attack, inappropriate network behavior, or email behavior. A machine-learning algorithm will look at the relevant points of data to support or refute that particular hypothesis of what the suspicious activity or abnormal behavior related for each hypothesis on what the suspicious activity or abnormal behavior relates to. Networks have a wealth of data and metrics that may be collected. The gatherers may then filter or condense the mass of data down into the important or salient features of data.

An ingestion module can collect input data received i) from a set of input probes, connectors, and/or other data input device or input method, deployed to a network distributed entity, such as in a third-party Cloud environment. The network entity can be a user and/or the user's device, as well as another network device interacting with the network. The input data received may describe any activity i) executed by the network entity as well as ii) administrated by a network administrator associated with the network, as well as communications between devices. A network-administrated activity may be network activity, email activity, or other application activity. Further, the ingestion module may be divided into an email module, SaaS module, a Cloud module, and a network module, where each module is configured to monitor and interaction with its corresponding network. The ingestion module monitoring a network entity's activity may feed collected data to a coordinator module to correlate causal links between these activities to supply this input into the cyber threat module. The ingestion module can collect the input data describing communication connections between devices in the network.

The cyber threat module may also use one or more machine-learning models trained on cyber threats in the network. The cyber threat module may reference the machine learning models that are trained on the normal behavior of user activity and network activity associated with the network. The cyber threat module can reference these various trained machine-learning models and data from the ingestion module and the trigger module. The cyber threat module can determine a threat risk parameter that factors in how the chain of unusual behaviors correlate to potential cyber threats and 'the likelihood that a chain of one or more unusual behaviors of the network activity and user activity under analysis fall outside of derived normal benign behavior;' and thus, is malicious behavior. In an embodiment, the ingestion module and the coordinator module may be portions of the cyber threat module.

The one or more machine learning models can be self-learning models using unsupervised learning and trained on a normal behavior of different aspects of the network, for example, device activity and user activity associated with a network host, such as a website. The self-learning models of normal behavior are regularly updated via, for example, using unsupervised machine learning algorithms. The self-learning model of normal behavior is updated when new input data is received that is deemed within the limits of normal behavior. A normal behavior threshold is used by the model as a moving benchmark of parameters that correspond to a normal pattern of life for the computing system. The normal behavior threshold is varied according to the updated changes in the computer system allowing the model to spot behavior on the computing system that falls outside the parameters set by the moving benchmark.

The comparison module can compare the analyzed metrics on the user activity and network activity compared to their respective moving benchmark of parameters that correspond to the normal pattern of life for the computing system used by the self-learning machine-learning models and the corresponding potential cyber threats.

The comparison module is configured to execute a comparison of input data to at least one machine-learning model to spot behavior on the network deviating from a normal benign behavior of that network entity. The comparison module receives the combined data set from the coordinator module. At least one machine-learning model is trained on a normal benign behavior of a network entity. The machine-learning model uses a normal behavior benchmark describing parameters corresponding to a normal pattern of activity for that network entity. The comparison module can use the comparison to identify whether the network entity is in a breach state of the normal behavior benchmark. The cyber threat module can then determine, in accordance with the analyzed metrics and the moving benchmark of what is considered normal behavior, a cyber-threat risk parameter indicative of a likelihood of a cyber-threat. The comparison module can be integrated with the cyber threat module.

The cyber threat defense system 100 may also include one or more machine learning models trained on gaining an understanding of a plurality of characteristics on a network host event and related data including classifying the properties of the network host event and its meta data.

The cyber threat module can generate a set of incident data describing an anomalous event by an entity, here representing a user or a device participating in the network. The cyber threat module can send data over to the user interface and display module to present (e.g. display, export, or print) the incident data to a user analyst for review. Alternately, the cyber threat module can execute an autonomous analyst to use machine learning to determine whether the entity has entered a breach state.

Alternately, the cyber threat module can execute an autonomous analyst to use machine-learning to determine whether the network entity in the breach state is a cyber threat. The cyber threat module is configured to identify whether the breach state identified by the comparison module and a chain of relevant behavioral parameters deviating from the normal benign behavior of that network entity correspond to a cyber threat.

The cyber threat defense system 100 may use multiple machine learning models. Each machine learning model may be trained on specific aspects of the normal pattern of life for the system such as devices, users, network traffic flow, outputs from one or more cyber security analysis tools analyzing the system, and others. One or more machine learning models may also be trained on characteristics and aspects of all manner of types of cyber threats. One or more machine learning models may also be trained by observing vectors for malicious activity, such as network activity or emails. One or more machine learning models may be trained by observing the activities of external hosts.

The cyber threat defense system can present the input data and identified cyber threats to a system user via a threat-tracking graphical user interface presented by a user interface module. The user interface can also present the breach state and the chain of relevant behavioral parameters with one or more of the data values replaced by a privacy alias.

The cyber threat defense system can supplement threat detection with a multivariate anomaly detector, such as a multivariate network structure anomaly detector, to identify incremental, distributed attack. In an incremental, distributed attack, also known as a "low and slow" attack, a malicious actor can try and escape detection by slowing down the pace of an attack and spreading the malicious actions over multiple devices acting in concert. This attack vector presents a problem to a cyber threat defense system, as each individual action by each individual device in the network may prove difficult for the cyber threat defense system to identify on their own. The cyber threat defense system can use batching and centrality to detect these "low and slow" attacks.

The cyber threat defense system can apply the principle of centrality from the discipline of graph theory in mathematics to identify these cyber threats. Graph theory is the study of graphs, particularly the study of traditional, simple graphs consisting of vertices, or nodes, and the lines, or edges, connecting those nodes. Graph theory studies how each node in a system interacts with other nodes in a system. Centrality refers to identifying the more important nodes in a graph based on the effect those nodes have on a characteristic of the graph. Changes of centrality in a single node can be indicative of greater changes in network activity across the entire network. The multivariate anomaly detector can use a simple graph to represent a network, with the nodes representing the devices in a network and the edges representing the communications between those devices. By identifying an unexplained or anomalous change in centrality in a node, a multivariate anomaly detector can identify a device represented by the node as potentially participating in a distributed attack.

The multivariate anomaly detector can have a graph detection module to collect and store network data in device states. The graph detection module is configured to generate a simple graph to represent the network. A node of the simple graph can represent a device in the network. An edge of the simple graph can represent a connection between devices in the network. The graph detection module can represent the simple graph as a connection matrix describing each edge in the network. The graph detection module can "symmetrize" the simple graph by adding the connection matrix to a transpose of the connection matrix. The graph detection module can weight each edge in the connection matrix with a logarithm of the data transfers on that edge. The graph detection module can represent the connection matrix as a weighted connection list to speed up later calculations. The graph detection module can add a configurable bonus onto every connection value to perturb the connection value away from zero.

The multivariate anomaly detector can now use "batching" to identify incremental attacks. In batching, the multivariate anomaly detector can group input data over a longer period of time to allow for the identification of more incremental activity. The multivariate anomaly detector can have a batch module to group the input data from the ingestion module into a graph data batch based on a fixed batch increment of time to identify incremental malicious activity. The batch module can adjust the batch increment of time based on the outcomes determined by the multivariate anomaly detector. The batch module can store the graph data batch as an entry in a graph history array. Alternately, the batch module can add the graph data batch for the device to a decaying variable associated with a device identifier for the device. The batch module can multiply the decaying variable by a decay factor after a graph data batch collection.

The multivariate anomaly detector can have a centrality processing module to calculate a multivariate centrality score for two or more devices based on the graph data batch describing device centrality to the network from the batch module. The centrality processing module can calculate the multivariate centrality score for two or more nodes representing two or more devices based on the graph data batch describing device centrality to the network using a different heuristic for each variate of the multivariate centrality score in order to identify at least a first node and a second node both acting in the anomalous state from the normal device network interactions.

By using different approaches to calculate different types of centrality scores, the multivariate anomaly detector can identify a broader range of aspects and effects of a device in the network.

The centrality processing module can use the graph data batch to calculate a network binding score as a variate of the multivariate centrality score. The network binding score describes a centrality variate using a centrality heuristic measuring a connection density of a node with other nodes in the network.

The centrality processing module can use the graph data batch to calculate an eigenvector centrality score as a variate of the multivariate centrality score. The eigenvector centrality score describes an influence of a node on the network by weighting connections to other influential nodes. The centrality processing module can add a connection matrix describing the simple graph to a multiple of an identity matrix to give preference to positive eigenvectors.

The centrality processing module can use a graph to calculate an access entropy score as a variate of the multivariate centrality score. The access entropy score describes a diversity of visited nodes by the node. The access entropy score focuses on the number of nodes accessible by the node over the influence of each node.

The multivariate anomaly detector can have an anomaly detector module to identify whether two or more devices are in an anomalous state from normal device network interactions based on the multivariate centrality score in order to identify the malicious activity distributed across multiple devices in the network. The anomaly detector module is further configured to compare the multivariate centrality score to a multivariate centrality score history to identify the malicious activity distributed across multiple devices in the network. The anomaly detector module can collect a centrality score history over a maturation period for each variate of the multivariate centrality score. For example, the centrality score history may have a network binding score history, an eigenvector centrality score history, an access entropy score history, or other centrality score histories. The anomaly detector module can compute a matrix of two-point correlations between each variate of the multivariate centrality score. The anomaly detector module can feed an anomaly radius for the multivariate centrality score into a probability distribution such as a one-tail Cauchy distribution to compute a survival probability.

The cyber-threat module is configured to identify cyber-attack upon identifying incremental malicious actions distributed across multiple devices in the network. The user interface module can display to a system user the input data, along with any centrality calculations, that lead the cyber threat defense system to determine that a device has entered an anomalous state indicating an incremental, distributed cyber-attack. Further, the communication module can use a communication module to send an alert to a system user that a cyber-attack is taking place.

The cyber threat defense system 100 can then take actions to counter detected potential cyber threats. The autonomous response module, rather than a human taking an action, can be configured to cause one or more rapid autonomous actions to be taken to contain the cyber threat when the threat risk parameter from the cyber threat module is equal to or above an actionable threshold. The cyber threat module's configured cooperation with the autonomous response module, to cause one or more autonomous actions to be taken to contain the cyber threat, improves computing devices in the email system by limiting an impact of the cyber threat from consuming unauthorized CPU cycles, memory space, and power consumption in the computing devices via responding to the cyber threat without waiting for some human intervention.

The autonomous response module can interact with the cyber threat module to automatically respond to any identified cyber threats. The cyber threat module may analyze the input data from any probes, connectors, and/or other data input device or method, at a network entity to identify any cyber threats. The cyber threat module may generate a threat risk parameter listing a set of values describing aspects of a potential cyber threat. The autonomous response module is configured to compare the threat risk parameter to a benchmark matrix having a set of benchmark scores to determine an autonomous response. The autonomous response module is configured to identify at least one autonomous response to take in response to the cyber threat based on the threat risk parameter. The autonomous response can be, for example, reducing permissions of the network entity or disabling a user account of the network entity. A communication module can send an alert of the cyber threat with a suggested response to the cyber threat to an internal system administrator.

The cyber threat defense system 100 may be hosted on a device, on one or more servers, or in its own cyber threat appliance platform.

Figure 2:
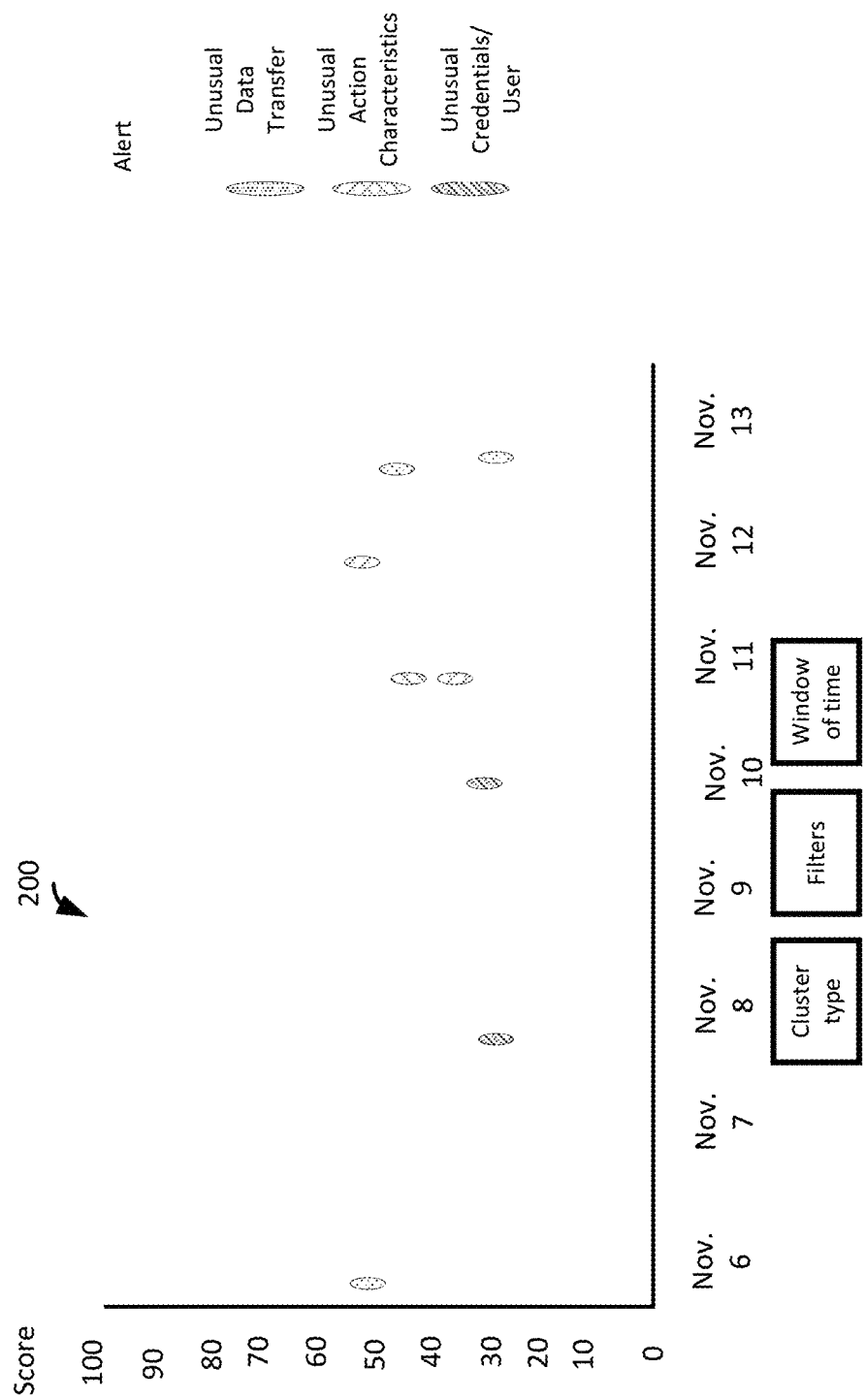
FIG. 2 illustrates a block diagram of an embodiment of an example chain of unusual behavior in connection with the rest of the network under analysis.

FIG. 2 illustrates a block diagram of an embodiment of an example chain of unusual behavior for the network entity in connection with the rest of the network under analysis.

The user interface can display a graph 200 of an example chain of unusual behaviors for the network entity in connection with the rest of the network under analysis.

The cyber threat module cooperates with one or more machine-learning models. The one or more machine-learning models are trained and otherwise configured with mathematical algorithms to infer, for the cyber threat analysis, 'what is possibly happening with the chain of distinct alerts and/or events, which came from the unusual pattern,' and then assign a threat risk associated with that distinct item of the chain of alerts and/or events forming the unusual pattern.

This is 'a behavioral pattern analysis' of what are the unusual behaviors of the network entity, such as a network, a system, a device, a user, or an email, under analysis by the cyber threat module and the machine-learning models. The cyber defense system uses unusual behavior deviating from the normal behavior and then builds a chain of unusual behavior and the causal links between the chain of unusual behavior to detect cyber threats. An example behavioral pattern analysis of what are the unusual behaviors may be as follows. The unusual pattern may be determined by filtering out what activities, events, or alerts that fall within the window of what is the normal pattern of life for that network entity under analysis. Then the pattern of the behavior of the activities, events, or alerts that are left, after the filtering, can be analyzed to determine whether that pattern is indicative of a behavior of a malicious actor, such as a human, a program, an email, or other threat. The defense system can go back and pull in some of the filtered out normal activities to help support or refute a possible hypothesis of whether that pattern is indicative of a behavior of a malicious actor. An example behavioral pattern included in the chain is shown in the graph over a time frame of, an example, 7 days. The defense system detects a chain of anomalous behavior of unusual data transfers three times, unusual characteristics in network actions in the monitored system three times which seem to have some causal link to the unusual data transfers. Likewise, twice unusual credentials tried unusual behavior of trying to access to sensitive areas or malicious IP addresses and the user associated with the unusual credentials trying unusual behavior has a causal link to at least one of those three emails with unusual characteristics. When the behavioral pattern analysis of any individual behavior or of the chain as a group is believed to be indicative of a malicious threat, then a score of how confident the defense system is in this assessment of identifying whether the unusual pattern was caused by a malicious actor is created. Next, also assigned is a threat level parameter (e.g. score or probability) indicative of what level of threat does this malicious actor pose to the system. Lastly, the cyber threat defense system is configurable in its user interface of the defense system on what type of automatic response actions, if any, the defense system may take when for different types of cyber threats that are equal to or above a configurable level of threat posed by this malicious actor.

The cyber threat module may chain the individual alerts and events that form the unusual pattern into a distinct item for cyber threat analysis of that chain of distinct alerts or events. The cyber threat module may reference the one or more machine-learning models trained on e-mail threats to identify similar characteristics from the individual alerts or events forming the distinct item made up of the chain of alerts or events forming the unusual pattern.

One or more machine-learning models may also be trained on characteristics and aspects of all manner of types of cyber threats to analyze the threat risk associated with the chain or cluster of alerts or events forming the unusual pattern. The machine-learning technology, using advanced mathematics, can detect previously unidentified threats, without relying on prescribed rules, and automatically defend networks.

The models may perform by the threat detection through a probabilistic change in normal behavior through the application of an unsupervised Bayesian mathematical model to detect behavioral change in computers and computer networks. The core threat detection system is termed the 'Bayesian probabilistic'. The Bayesian probabilistic approach can determine periodicity in multiple time series data and identify changes across single and multiple time series data for the purpose of anomalous behavior detection. From the email and network raw sources of data, a large number of metrics can be derived, each producing time series data for the given metric.

The detectors in the cyber threat module including its cooperating module components can be discrete mathematical models that implement a specific mathematical method against different sets of variables with the target. Thus, each model is specifically targeted on the pattern of life of alerts and/or events coming from, for example, i) that cyber security analysis tool, ii) analyzing various aspects of the emails, iii) coming from specific devices and/or users within a system, etc.

At its core, the cyber threat defense system mathematically characterizes what constitutes 'normal' behavior based on the analysis of a large number/set of different measures of a devices network behavior. The cyber threat defense system can build a sophisticated 'pattern of life'—that understands what represents normality for every person, device, email activity, and network activity in the system being protected by the cyber threat defense system.

As discussed, each machine-learning model may be trained on specific aspects of the normal pattern of life for the system such as devices, users, network traffic flow, outputs from one or more cyber security analysis tools analyzing the system, email contact associations for each user, email characteristics, and others. The one or more machine-learning models may use at least unsupervised learning algorithms to establish what is the normal pattern of life for the system. The machine-learning models can train on both i) the historical normal distribution of alerts and events for that system and ii) a normal distribution information from similar peer systems to establish the normal pattern of life of the behavior of alerts or events for that system. Another set of machine-learning models train on characteristics of emails and the activities and behavior of its email users to establish a normal for these.

The models can leverage at least two different approaches to detecting anomalies: such as comparing each system's behavior to its own history and comparing that system to its peers' history or such as comparing an email to both characteristics of emails and the activities and behavior of its email users. This multiple source comparison allows the models to avoid learning existing bad behavior as 'a normal behavior', because compromised entities, such as devices, users, components, emails will exhibit behavior different to their immediate peers.

In addition, the one or more machine-learning models can use the comparison of i) the normal pattern of life for that system corresponding to the historical normal distribution of alerts and events for that system mapped out in the same multiple dimension space to ii) the current chain of individual alerts and events behavior under analysis. This comparison can yield detection of the one or more unusual patterns of behavior within the plotted individual alerts or events, which allows the detection of previously unidentified cyber threats compared to finding cyber threats with merely predefined descriptive objects or signatures. Thus, increasingly intelligent malicious cyber threats, picking and choosing when they take their actions in order to generate low level alerts and event, will still be detected, even though they have not yet been identified by other methods of cyber analysis. These intelligent malicious cyber threats can include malware, spyware, key loggers, malicious links in an email, malicious attachments in an email, and others as well as nefarious internal information technology staff who know intimately how to not set off any high-level alerts or events.

Note, each of the individual alerts or events in a chain of alerts or events that form the unusual pattern can indicate subtle abnormal behavior. Thus, each alert or event can have a low threat risk associated with that individual alert or event. However, when analyzed as a distinct chain or grouping of alerts or events behavior forming the chain of unusual pattern by the one or more machine-learning models, that distinct chain of alerts or events can be determined to now have a much higher threat risk than any of the individual and/or events in the chain.

In addition, modern cyber-attacks can be of such severity and speed that a human response cannot happen quickly enough. Thanks to these self-learning advances, a machine may uncover these emerging threats and deploy appropriate, real-time responses to fight back against the most serious cyber threats.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine, email, and human activity behaviorally, at and after the point of compromise, in order to predict and catch today's increasingly sophisticated cyber-attack vectors. It is thus possible to computationally establish what is normal, in order to then detect what is abnormal. In addition, the machine-learning constantly revisits assumptions about behavior, using probabilistic mathematics. The cyber threat defense system's unsupervised machine-learning methods do not require training data with pre-defined labels. Instead, unsupervised machine-learning methods may identify key patterns and trends in the data, without the need for human input.

The user interface and output module may also project the individual alerts and/or events forming the chain of behavior onto the user interface with at least three-dimensions of i) a horizontal axis of a window of time, ii) a vertical axis of a scale indicative of the threat risk assigned for each alert and/or event in the chain and a third dimension of iii) a different color for the similar characteristics shared among the individual alerts and events forming the distinct item of the chain. The different color may be red, blue, yellow, or others. For gray scale, the user interface may use different shades of gray, black, and white with potentially different hashing patterns.

Defense System

Figure 3:
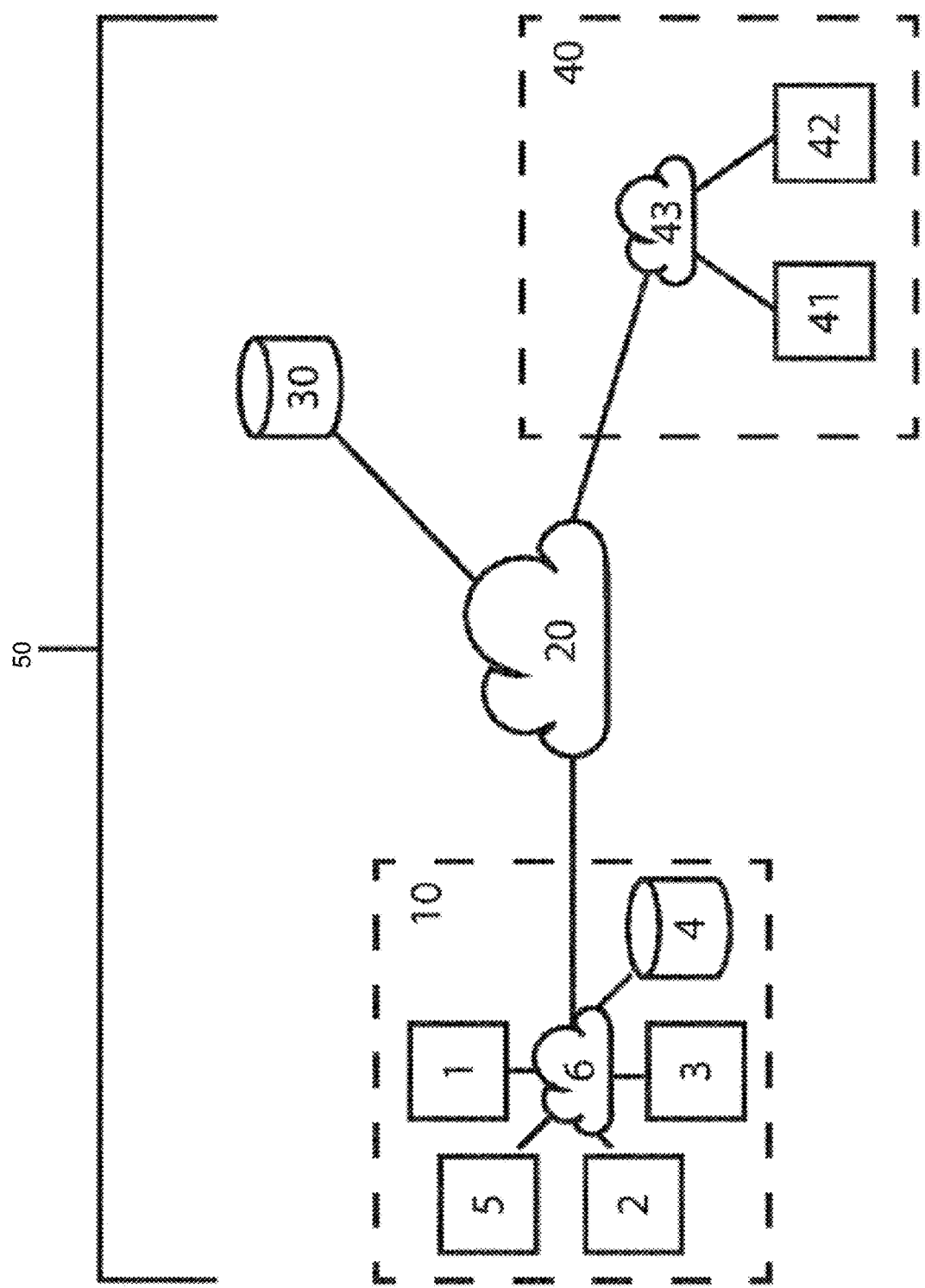
FIG. 3 illustrates a diagram of an embodiment of an example cyber threat defense system protecting an example network.

FIG. 3 illustrates an example cyber threat defense system protecting an example network. The example network FIG. 3 illustrates a network of computer systems 50 using a threat detection system. The system depicted by FIG. 3 is a simplified illustration, which is provided for ease of explanation of the invention. The system 50 comprises a first computer system 10 within a building, which uses the threat detection system to detect and thereby attempt to prevent threats to computing devices within its bounds. The first computer system 10 comprises three computers 1, 2, 3, a local server 4, and a multifunctional device (MFD) 5 that provides printing, scanning and facsimile functionalities to each of the computers 1, 2, 3. All of the devices within the first computer system 10 are communicatively coupled via a local area network (LAN) 6. Consequently, all the computers 1, 2, 3 can access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 3.

The computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network. Computer 2 is active from about 8:30 AM until 6 PM and usually communicates with machines in the company's U.K. office in second computer system 40 between 9.30 AM and midday. The same employee virtually never accesses the employee time sheets, very rarely connects to the company's Atlanta network, and has no dealings in South-East Asia. The threat detection system takes all the information that is available relating to this employee to establish a 'pattern of life' for that person, which is dynamically updated as more information is gathered. The 'normal' model is used as a moving benchmark, allowing the system to spot behavior on a system that seems to fall outside of this normal pattern of life and to flag this behavior as anomalous, requiring further investigation.

The threat detection system is built to deal with the fact that today's attackers are getting stealthier. An attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, to defeat a relatively-simple policing process. These sophisticated attackers look for activity that is not directly associated with the user's input. As an Advanced Persistent Threat (APT) attack typically has very long mission windows of weeks, months, or years, such processor cycles can be stolen so infrequently that they do not impact machine performance. However cloaked and sophisticated the attack is, the attack will always leave a measurable delta, even if extremely slight, in typical machine behavior, between pre and post compromise. This behavioral delta can be observed and acted on with the form of Bayesian mathematical analysis used by the cyber threat defense system installed on the computer 1.

Figure 4:
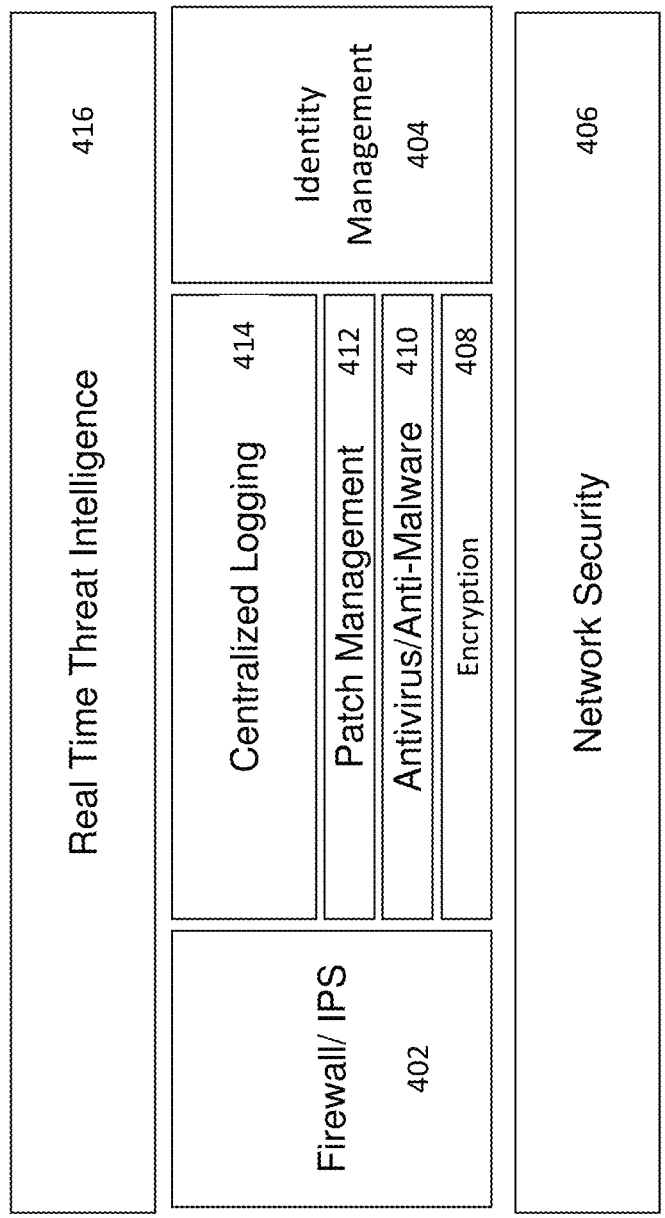
FIG. 4 illustrates in a block diagram of an embodiment of the integration of the threat detection system with other network protections.

FIG. 4 illustrates in a block diagram the integration of the threat detection system with other network protections.

The cyber threat defense system can act as real time threat intelligence 416 for the network. The real time threat intelligence may interact with the other defense components to protect the network.

The cyber threat defense system uses machine-learning technology to self-learn on this network and its entities that the components of the cyber threat defense system are protecting.

Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. The approach may thus computationally establish what is normal, in order to then detect what is abnormal.

Figure 5:
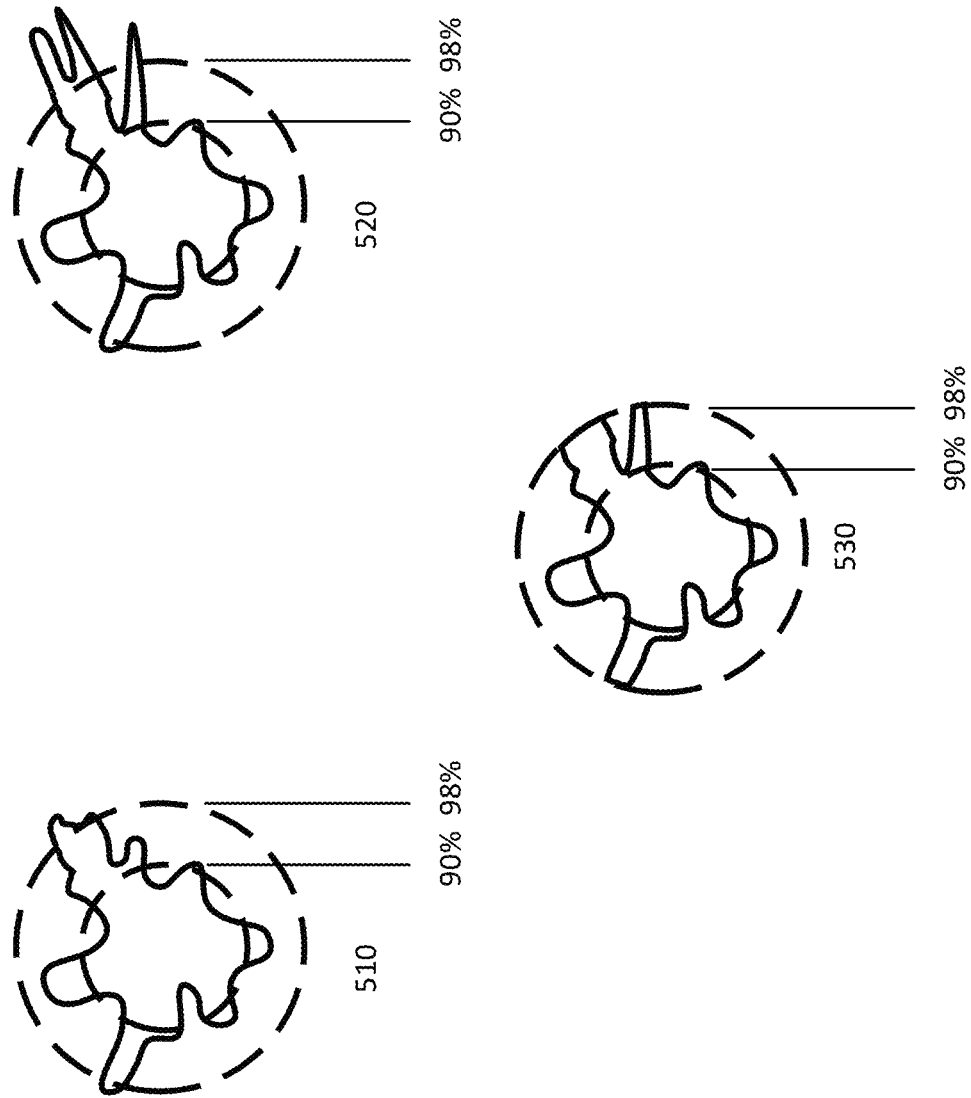
FIG. 5 illustrates a diagram of an embodiment of an application of a cyber threat defense system using advanced machine-learning to detect anomalous behavior.

FIG. 5 illustrates an application of a cyber threat defense system using advanced machine-learning to detect anomalous behavior. A normal pattern of behavior 510 may describe a set of user or device behavior within a threshold level of occurrence, such as a 98% probability of occurrence based on prior behavior. An anomalous activity 520 may describe a set of user or device behavior that is above the threshold level of occurrence. The cyber threat defense system can initiate an autonomous response 530 to counteract the anomalous activity, leaving the normal behavior unaffected.

The unsupervised machine-learning algorithms allow these AI models to recognize evolving threats, without prior warning or supervision.

Unsupervised Machine-Learning

Unsupervised learning works things out without pre-defined labels, such as all of the data fields having consistent labels. This allows the system to handle the unexpected and embrace uncertainty. The system does not always know the characteristics of the target of the search but can independently classify data and detect compelling patterns.

The cyber threat defense system's unsupervised machine-learning methods do not require training data with pre-defined labels. Instead, unsupervised machine-learning methods can identify key patterns and trends in the data, without the need for human input. Unsupervised learning provides the advantage of allowing computers to go beyond what their programmers already know and discover previously unknown relationships.

The cyber threat defense system uses unique implementations of unsupervised machine-learning algorithms to analyze network data at scale, intelligently handle the unexpected, and embrace uncertainty. Instead of relying on knowledge of past threats to be able to know what to look for, the cyber threat defense system may independently classify data and detect compelling patterns that define what may be considered to be normal behavior. Any new behaviors that deviate from this notion of 'normality' may indicate threat or compromise. The impact of the cyber threat defense system's unsupervised machine-learning on cyber security is transformative. Threats from within, which would otherwise go undetected, can be spotted, highlighted, contextually prioritized, and isolated using these algorithms. The application of machine-learning has the potential to provide total network visibility and far greater detection levels, ensuring that networks have an internal defense mechanism. Machine-learning has the capability to learn when to execute automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine-learning is extremely complex and difficult to get right. Robust, dependable algorithms are developed, with a scalability that enables their successful application to real-world environments.

Overview

In an embodiment, the cyber threat defense system's probabilistic approach to cyber security is based on a Bayesian framework. This allows the cyber threat defense system to integrate a huge number of weak indicators of potentially anomalous network behavior to produce a single clear measure of how likely a network device is to be compromised. This probabilistic mathematical approach provides an ability to understand important information amid the noise of the network, even when the target of a search is unknown.

Ranking Threats

Crucially, the cyber threat defense system's approach accounts for the inevitable ambiguities that exist in data, distinguishing between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner, prioritizing those that most urgently require action and simultaneously removing the problem of numerous false positives associated with a rule-based approach.

On a core level, the cyber threat defense system mathematically characterizes what constitutes 'normal' behavior based on the analysis of a large number of different measures of network behavior by a device. Such network behavior may include server access, data access, timings of events, credential use, domain name server (DNS) requests, and other similar parameters. Each measure of network behavior is then monitored in real time to detect anomalous behaviors.

Clustering

To be able to properly model what should be considered as normal for a device, the behavior of the device must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix-based clustering, density based clustering, and hierarchical clustering techniques. The resulting clusters are then used to inform the modeling of the normative behaviors of individual devices. Clustering analyzes behavior in the context of other similar devices on the network. Clustering algorithms identify naturally occurring groupings of devices, which is impossible to do manually. Further, the cyber threat defense system may simultaneously run multiple different clustering methods to inform the models.

The inoculation module may also use clustering to identify which devices to send an inoculation notice. The inoculation module may select devices that have similar characteristics relevant to the anomalous event.

Network Topology

Any cyber threat detection system must also recognize that a network is far more than the sum of its individual parts, with much of its meaning contained in the relationships among its different entities. Plus, any cyber threat defense system must further recognize that complex threats can often induce subtle changes in this network structure. To capture such threats, the cyber threat defense system employs several different mathematical methods in order to be able to model multiple facets of a network topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise local area network (LAN), wide area network (WAN) and Cloud is difficult because both input and output can contain many interrelated features, such as protocols, source and destination machines, log changes, rule triggers, and others. Learning a sparse and consistent structured predictive function is crucial to avoid over fitting.

In this context, the cyber threat defense system has employed a cutting edge large-scale computational approach to learn sparse structure in models of network behavior and connectivity based on applying L1-regularization techniques, such as a Least Absolute Shrinkage and Selection Operator (LASSO) method. This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models can constantly adapt themselves, in a computationally efficient manner, as new information becomes available to the system. The mathematical models continually recalculate threat levels in the light of new evidence, identifying changing attack behaviors where conventional signature-based methods fail.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that can identify subtle variations in machine events within a computer networks behavioral history that may indicate cyber-threat or compromise.

The cyber threat defense system uses mathematical analysis and machine-learning to detect potential threats, allowing the system to stay ahead of evolving risks. The cyber threat defense system approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber threat defense system can create digital antibodies automatically, as an immediate response to the most threatening cyber breaches. The cyber threat defense system approach both detects and defends against cyber threat. Genuine unsupervised machine-learning eliminates the dependence on signature-based approaches to cyber security, which are not working. The cyber threat defense system's technology can become a vital tool for security teams attempting to understand the scale of their network, observe levels of activity, and detect areas of potential weakness. These no longer need to be manually sought out, but rather are flagged by the automated system and ranked in terms of their significance.

Machine-learning technology is the fundamental ally in the defense of systems from the hackers and insider threats of today, and in formulating response to unknown methods of cyber-attack. It is a momentous step change in cyber security. Defense must start within.

An Example Method

The threat detection system shall now be described in further detail with reference to a flow of the process carried out by the threat detection system for automatic detection of cyber threats through probabilistic change in normal behavior through the application of an unsupervised Bayesian mathematical model to detect behavioral change in computers and computer networks.

The core threat detection system is termed the 'Bayesian probabilistic'. The Bayesian probabilistic is a Bayesian system of automatically determining periodicity in multiple time series data and identifying changes across single and multiple time series data for the purpose of anomalous behavior detection.

Figure 6:
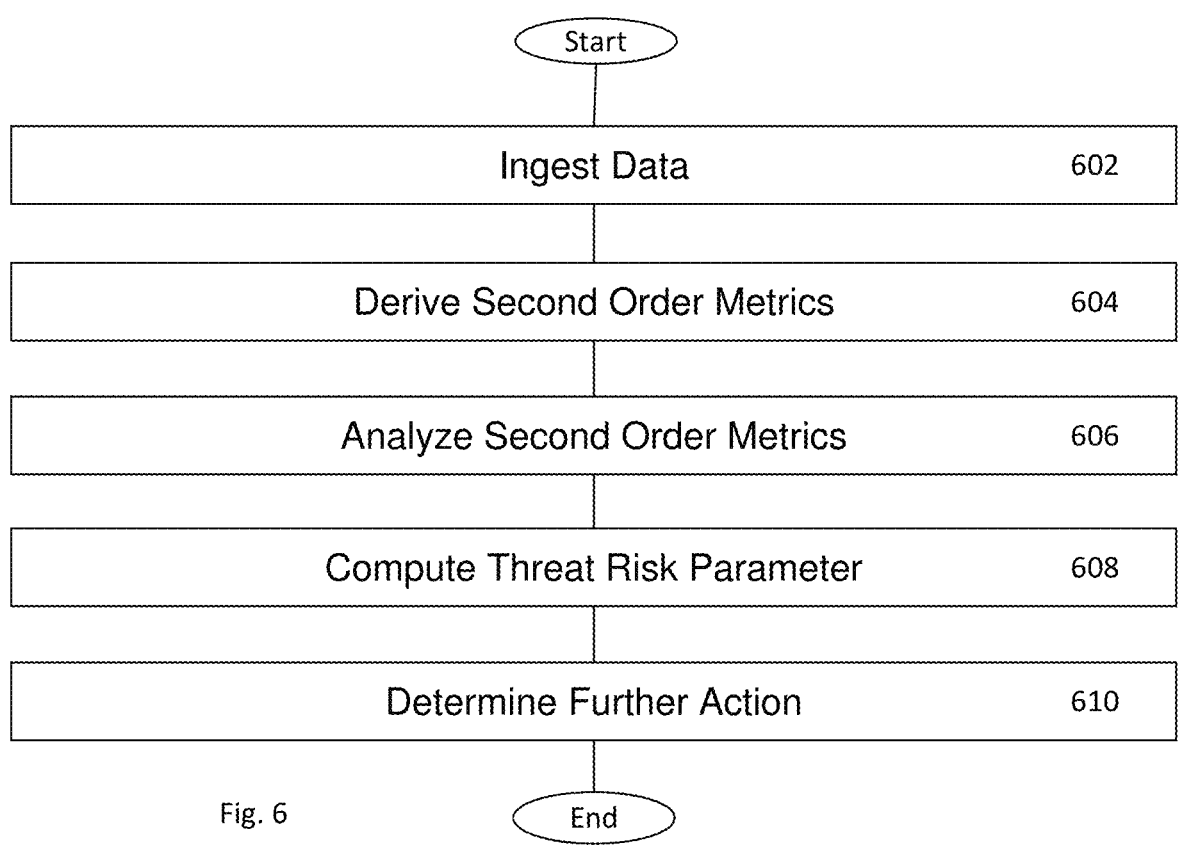
FIG. 6 illustrates a flowchart of an embodiment of a method for modeling human activity, machine activity, or other activity.

FIG. 6 illustrates a flowchart of an embodiment of a method for modeling human, machine or other activity. The cyber threat defense system initially ingests data from multiple sources (Block 602). The raw data sources include, but are not limited to raw network Internet Protocol (IP) traffic captured from an IP or other network Test Access Points (TAP) or Switched Port Analyzer (SPAN) port; machine generated log files; building access ("swipe card") systems; IP or non-IP data flowing over an Industrial Control System (ICS) distributed network; individual machine, peripheral or component power usage; telecommunication signal strength; or machine level performance data taken from on-host sources, such as central processing unit (CPU) usage, memory usage, disk usage, disk free space, network usage, and others.

The cyber threat defense system derives second order metrics from that raw data (Block 604). From these raw sources of data, multiple metrics can be derived, each producing time series data for the given metric. The data are bucketed into individual time slices. For example, the number observed could be counted per 1 second, per 10 seconds or per 60 seconds. These buckets can be combined at a later stage where required to provide longer range values for any multiple of the chosen internal size. For example, if the underlying time slice chosen is 60 seconds long, and thus each metric time series stores a single value for the metric every 60 seconds, then any new time series data of a fixed multiple of 60 seconds (such as 120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge.

The actual specific metrics used are largely irrelevant to the Bayesian probabilistic system, as long as a metric is selected. Metrics derived from network traffic could include data such as the number of bytes of data entering or leaving a networked device per time interval, file access, the commonality or rarity of a communications process, an invalid secure-sockets layer (SSL) certification, a failed authorization attempt, or email access patterns.

In the case where transmission control protocol (TCP), user datagram protocol (UDP), or other Transport Layer IP protocols are used over the IP network, and in cases where alternative Internet Layer protocols are used, such as Internet Control Message Protocol (ICMP) or Internet Group Message Protocol (IGMP), knowledge of the structure of the protocol in use and basic packet header analysis can be utilized to generate further metrics. Such further metrics may include the number of multicasts per time interval originating from a networked device and intended to reach publicly addressable IP ranges, the number of internal link-local IP Broadcast requests originating from a networked device, the size of the packet payload data, or the number of individual TCP connections made by a device, or data transferred by a device, either as a combined total across all destinations or to any definable target network range, such as a single target machine or a specific network range.

In the case of IP traffic where the Application Layer protocol can be determined and analyzed, further types of time series metric can be defined. These time series metrics may include, for example, the number of DNS requests a networked device generates per time interval, again either to any definable target network range or in total; the number of Simple Mail Transfer Protocol (SMTP), Post Office Protocol (POP) or Internet Message Access Protocol (IMAP) logins or login failures a machine generates per time interval; the number of Lightweight Directory Access Protocol (LDAP) logins or login failures generated; data transferred via file sharing protocols such as Server Message Block (SMB), SMB2, File Transfer Protocol (FTP), or others; or logins to Microsoft Windows Active Directory, Secure Shell (SSH) or Local Logins to Linux or Unix-like systems, or other authenticated systems such as Kerberos.

The raw data required to obtain these metrics may be collected via a passive fiber or copper connection to the networks internal switch gear, from virtual switching implementations, cloud-based systems, or communicating devices themselves. Ideally, the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data sets are extremely sparse, with most data points equal to 0. Examples would be employee's using swipe cards to access a building or part of a building, or user's logging into their workstation, authenticated by Microsoft Windows Active Directory Server, which is typically performed a small number of times per day. Other time series data sets are much more populated, such as, the size of data moving to or from an always-on Web Server, the Web Servers CPU utilization, or the power usage of a photocopier.

Regardless of the type of data, such time series data sets, whether originally produced as the result of explicit human behavior or an automated computer or other system to exhibit periodicity, have the tendency for various patterns within the data to recur at approximately regular intervals. Furthermore, such data may have many distinct but independent regular time periods apparent within the time series.

Detectors carry out analysis of the second order metrics (Block 606). Detectors are discrete mathematical models that implement a specific mathematical method against different sets of variables with the target network. For example, Hidden Markov Models (HMM) may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and or computers. These attributes may be value over time for all internal computational features such as packet velocity and morphology, endpoint file system values, and TCP/IP protocol timing and events. Each detector is specialized to record and make decisions on different environmental factors based on the detectors own internal mathematical model such as an HMM.

While the threat detection system may be arranged to look for any possible threat, in practice the system may keep watch for one or more specific threats depending on the network in which the threat detection system is being used. For example, the threat detection system provides a way for known features of the network such as desired compliance and Human Resource policies to be encapsulated in explicitly defined heuristics or detectors that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing detectors and local contextual information. These chains of logical expression are then stored in online libraries and parsed in real-time against output from the measures/tokenizing detectors. An example policy could take the form of "alert me if any employee subject to HR disciplinary circumstances (contextual information) is accessing sensitive information (heuristic definition) in a manner that is anomalous when compared to previous behavior (Bayesian probabilistic output)". In other words, different arrays of pyramids of detectors are provided for detecting particular types of threats.

The analysis performed by the detectors on the second order metrics then outputs data in a form suitable for use with the model of normal behavior. As will be seen, the data is in a form suitable for comparing with the model of normal behavior and for updating the model of normal behavior.

The threat detection system computes a threat risk parameter indicative of a likelihood of there being a threat using automated adaptive periodicity detection mapped onto observed behavioral pattern-of-life analysis (Block 608). This deduces that a threat over time exists from a collected set of attributes that themselves have shown deviation from normative collective or individual behavior. The automated adaptive periodicity detection uses the period of time the Bayesian probabilistic has computed to be most relevant within the observed network or machines. Furthermore, the pattern of life analysis identifies how a human or machine behaves over time, such as when they typically start and stop work. Since these models are continually adapting themselves automatically, they are inherently harder to defeat than known systems. The threat risk parameter is a probability of there being a threat in certain arrangements. Alternatively, the threat risk parameter is a value representative of there being a threat, which is compared against one or more thresholds indicative of the likelihood of a threat.

In practice, the step of computing the threat involves comparing current data collected in relation to the user with the model of normal behavior of the user and system being analyzed. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

The system uses machine-learning or Artificial Intelligence to understand what is normal inside a company's network, and when something's not normal. The system then invokes automatic responses to disrupt the cyber-attack until the human team can catch up. This could include interrupting connections, preventing the sending of malicious emails, preventing file access, preventing communications outside of the organization, etc. The approach begins in as surgical and directed way as possible to interrupt the attack without affecting the normal behavior of, for example, a laptop. If the attack escalates, the cyber threat defense system may ultimately quarantine a device to prevent wider harm to an organization.

In order to improve the accuracy of the system, a check can be carried out in order to compare current behavior of a user with associated users, such as users within a single office. For example, if there is an unexpectedly low level of activity from a user, this may not be due to unusual activity from the user, but rather a factor affecting the office as a whole. Various other factors can be considered in order to assess whether abnormal behavior is actually indicative of a threat.

Finally, the cyber threat defense system determines, based on the threat risk parameter, as to whether further action need be taken regarding the threat (Block 610). A human operator may make this determination after being presented with a probability of there being a threat. Alternately, an algorithm may make the determination, such as by comparing the determined probability with a threshold.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D user interface. The projection can scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network, and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured input/output problems, such as the observation of packet traffic and host activity within a distributed digital enterprise, where both input and output can contain tens of thousands to millions of interrelated features (data transport, host-web-client dialogue, log change and rule trigger, etc.), learning a sparse and consistent structured predictive function is challenged by a lack of normal distribution. To overcome this, the threat detection system comprise a data structure that decides on a rolling continuum rather than a stepwise method in which recurring time cycles, such as the working day, shift patterns, and other routines are dynamically assigned, thus providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

Figure 7:
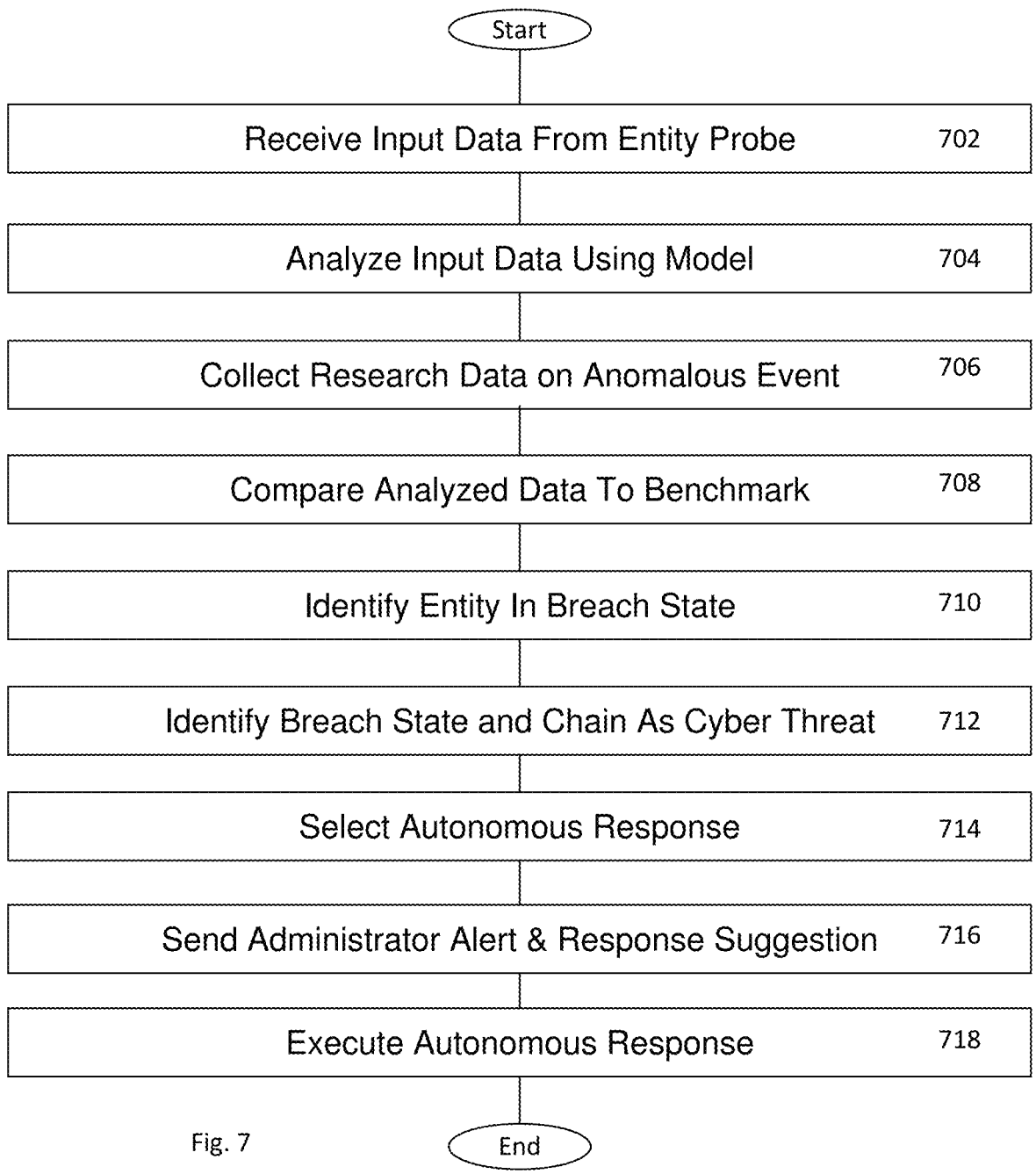
FIG. 7 illustrates a flowchart of an embodiment of a method for identifying a cyber threat.

Once the cyber threat has been identified, the cyber threat defense system can perform an autonomous response. FIG. 7 illustrates a flowchart of an embodiment of a method for identifying a cyber threat and performing an autonomous response. The cyber threat defense system can receive, via at least one input port, input data from, for example, a probe monitoring a network entity, such as a user, a device, etc., on a network being protected by the cyber threat defense system (Block 702). The cyber threat defense system has a cyber threat module configured to analyze the input data using one or more machine-learning model to spot behavior on the network deviating from a normal benign behavior of that network entity (Block 704). The one or more machine-learning models are initially trained on generic normal benign behavior of a generic network entity using a normal behavior benchmark describing parameters corresponding to a normal pattern of activity for that network entity. However, the machine-learning models are then specifically trained on a regular basis on the normal benign behavior of the network entities in the network that they are modeling. Each model can be trained on a separate network entity and/or a class of network entities. The cyber threat defense system can collect an outside data set describing at least one of an outside action and an outside state related to the input data from at least one data source outside the network (Block 706). The cyber threat defense system has a comparison module that compares the input data to a machine-learning model to spot behavior on the network deviating from a normal benign behavior of that network entity (Block 708). The comparison module can identify whether the network entity is in a breach state of the normal behavior benchmark (Block 710). The cyber threat module can identify whether the breach state and a chain of relevant behavioral parameters deviating from the normal benign behavior of that network entity correspond to a cyber threat (Block 712).

The cyber threat defense system can use an autonomous response module configured to select an autonomous response to take in response to the cyber threat (Block 714). The autonomous response can be, for example, reducing permissions of the network entity or disabling a user account of the network entity. The autonomous response module can send an alert of the cyber threat with a suggested response to the cyber threat to an internal system administrator (Block 716). The autonomous response module can execute the autonomous response in response to the cyber threat (Block 718).

Figure 8:
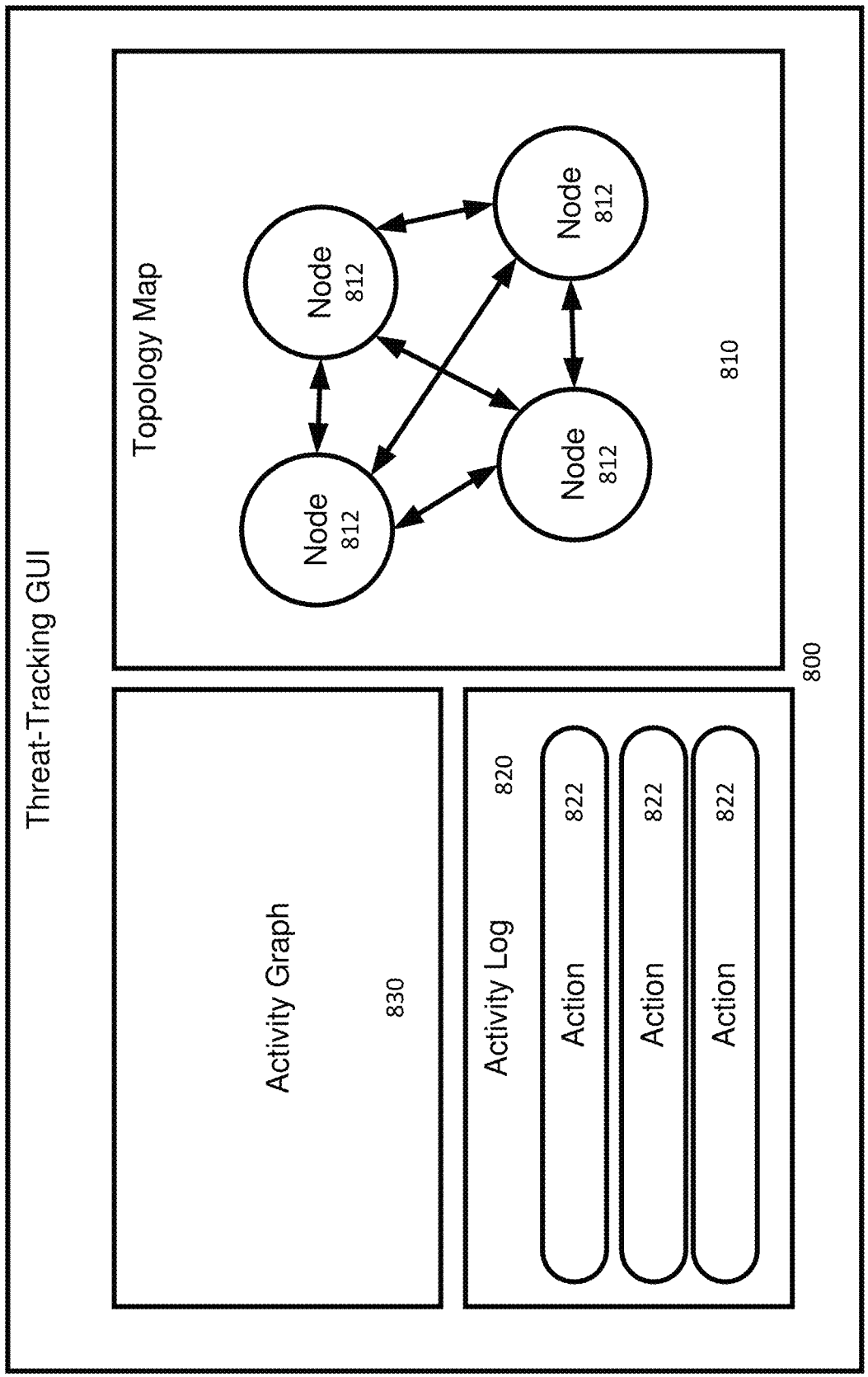
FIG. 8 illustrates a block diagram of an embodiment of a threat-tracking graphical user interface.

FIG. 8 illustrates a block diagram of a threat-tracking graphical user interface 800. The threat-tracking graphical user interface 800 may have a topology map 810 displaying a two-dimensional or three-dimensional representation of the network. The topology map 810 can have one or more network nodes 812 acting as a visual avatar for a network entity on the network. The topology map 810 can illustrate each connection between a network node 812 and any other network node 812 in contact with that network node 812. A network node 812 can be marked to indicate an issue with the represented network entity. The user analyst can select a network node 812 with the cursor to reveal more information about the represented network entity.

Upon the selection of a network entity via selection of the network node 812, the threat-tracking graphical user interface can display an action log 820 for that network entity. The action log 820 may list an action line 822 describing each action by that network entity over a set period. The threat-tracking graphical user interface 800 can append an alert to an action line 822 to indicate a hazard to the network. The threat-tracking graphical user interface can use the action log 820 to generate an activity graph 830 to show the amount of activity over time. The user analyst can identify problem network entities by identifying spikes in the activity graph. The user analyst can filter the action log 820 or the activity graph 830 based on user specified criteria, such as action type, entity type, time period, or threat level.

The method and system can be arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may also be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Multivariate Anomaly Detector

A multivariate anomaly detector can detect a cyber threat by a malefactor trying to hide the actions associated with the cyber threat. For example, the malefactor may infect multiple devices in a network, causing the malicious activities to be generated from different devices within the network. The multivariate anomaly detector can look at multiple independent mathematical or statistical variables. For example, the multivariate anomaly detector can identify devices on the network directly connecting to that device plus devices connected to those devices in order to determine a device's position within the network. The multivariate anomaly detector can then compute the centrality, or importance, of each device to the network by using multiple heuristics to calculate multiple centrality scores for each device. For example, the multivariate anomaly detector can then examine the eigenvector centrality and accessibility to determine the impact of that device on the network.

Additionally, the multivariate anomaly detector can apply practices from statistical physics for a different approach to determining centrality. The multivariate anomaly detector can evaluate the coupling of devices in a manner similar to coupling of magnetic dipoles. In this example, two devices are considered more highly coupled because they send more data between each other, and thus are more highly aligned with each other. The multivariate anomaly detector can evaluate how the coupling of devices changes over a window of time. The multivariate anomaly detector can use algorithms to more easily calculate with less processing cycles how the coupling of devices changes over a window of time. The multivariate anomaly detector can look at anomalous changes in dipoles, such as individual changes and respective changes relative to each dipole. The multivariate anomaly detector can then assign a score.

Based on the scores, the multivariate anomaly detector can figure out the strangest changes as well as other anomalies. The multivariate anomaly detector is not confined to looking at communications from a single device acting oddly in a network. Rather, the multivariate anomaly detector can use mathematical processes and algorithms to detect a distributed malware acting over a group of infected devices. For example, the multivariate anomaly detector can look at a set of devices and their centrality within a network, where each device is a node in the network. The multivariate anomaly detector detects as more data is transferred between devices, as the centrality of each node begins to alter. A comparison and checks can be made to determine if this behavior is strange or abnormal. The process can encompass an analysis of seeing if multiple devices have changing centralities and then determine whether these changes are strange. If so, the multivariate anomaly detector may determine a higher probability of a low slow distributed cyber threat being behind this strange increase in communications or activities between sets of devices.

The multivariate anomaly detector collects quasi-local network observables as anomalies, or even 'AI-powered' threats of the future, may have a distributed network presence, rather than generating loud and focused traffic from individual devices. A sophisticated attacker might look to exploit a general industry focus on individual devices by moderating the traffic load from individually infected devices and coordinating them in a distributed, stealthy fashion that keeps the size of data transfers small. Such an attack might still be loud overall, but careful not to trip any detector attached to individual devices. The network topology detection aside, previous cyber threat defense systems are mostly unconcerned with network structure observables. Even previous network topology detectors are mostly "local" in the sense that they are checking for individual devices initiating strange connections as a strictly one-step process. For devices with relativity little data, a cyber threat defense system may have difficulty telling what "normal" is, so most detectors do not predict anomalies for all devices on the network. For very busy devices, a cyber threat defense system may have a "needle in a haystack" issue that the anomalous signal may be swamped by the noise.

The multivariate anomaly detector can employ some more sophisticated network mathematics, such as graph theory, in the detection of distributed anomalies. However, the multivariate anomaly detector can also provide useful information from which the anomaly can be diagnosed, rather than a nebulously assertion that something is wrong without any data to back up the assertion.

The multivariate anomaly detector can balance the need for data within the existing framework by predicting anomalies for each device derived from the position of that device within the network structure. This approach is quasi-local, in the sense that these characteristics are attributed to a device, but are calculated from information about the wider neighborhood.

A multivariate anomaly detector may flag an anomaly for a device because of unusual activity in the neighborhood, rather than reacting to that device's own activity. This distributed, wide-view approach may not be familiar for cyber-analysts following an established workflow but should alert any analyst to the distributed nature of this anomaly, while also giving a useful starting point for the investigation.

A simple example would be a device suddenly became the recipient of a large number of unusual connections, perhaps in a coordinated effort from a number of infected hosts. Such activity might not be alarmingly anomalous for each individual caller to initiate a small connection to that recipient. Since those devices initiated the connection, these connections may not trigger the recipient's other anomaly predictions, not even network topology. However, the multivariate anomaly detector would see this as an unusual increase in that device's centrality metrics.

Strange decreases in the centrality metrics may also trigger anomalies, as would strange relative changes between centrality metrics. Thus, the multivariate anomaly detector is sensitive to many strange network behaviors. Whilst calculating anomalies after a batch process requires a longer timeframe to other anomaly prediction methods, compared to other anomaly predictions taking a regular 'core sample' provides resistance to attacks where strange behavior is slowly built up over time to appear as the new "normal".

Figure 9:
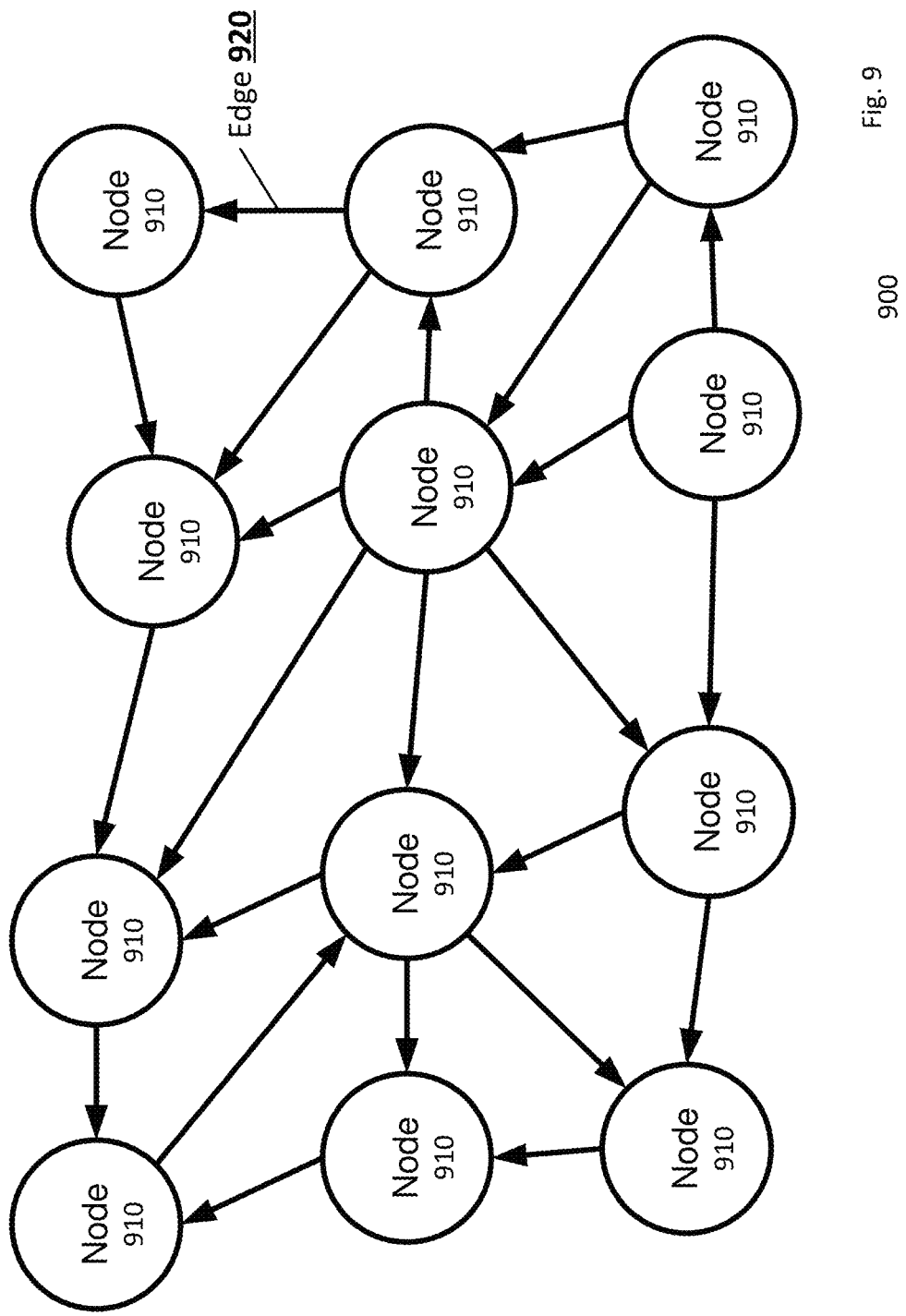
FIG. 9 illustrates a block diagram of an embodiment of a simple graph representing a network.

The multivariate anomaly detector can perform network analysis to determine the centrality of the various devices in the network. Network analysis is the application of the principles of graph theory to a network to model the behavior of that network. FIG. 9 illustrates a block diagram of an embodiment of a simple graph 900 representing a network. The simple graph 900 can represent each device on the network with a node 910. The simple graph 900 can represent each communication between two devices with an edge 920, or line, connecting the two representative nodes 910. In an asymmetric simple graph 900, the edge 920 is directional, indicating which device initiated the communication. In a symmetric simple graph 900, the edge 920 is non-directional, representing communications initiated by either device.

The multivariate anomaly detector can use a simple graph and data collected by the cyber threat defense system to calculate a multivariate centrality score for each node on a pre-determined cycle. A multivariate centrality score can provide multiple centrality scores for the same device, with each centrality score calculated using a different heuristic to describe a range of centrality characteristics about the device. The multivariate anomaly detector can then determine any variations in the multivariate centrality score to identify any anomalous activity by two or more devices. The multivariate anomaly detector can use this anomalous activity to identify a cyber-attack using incremental malicious actions distributed across multiple device in the network.

Figure 10:
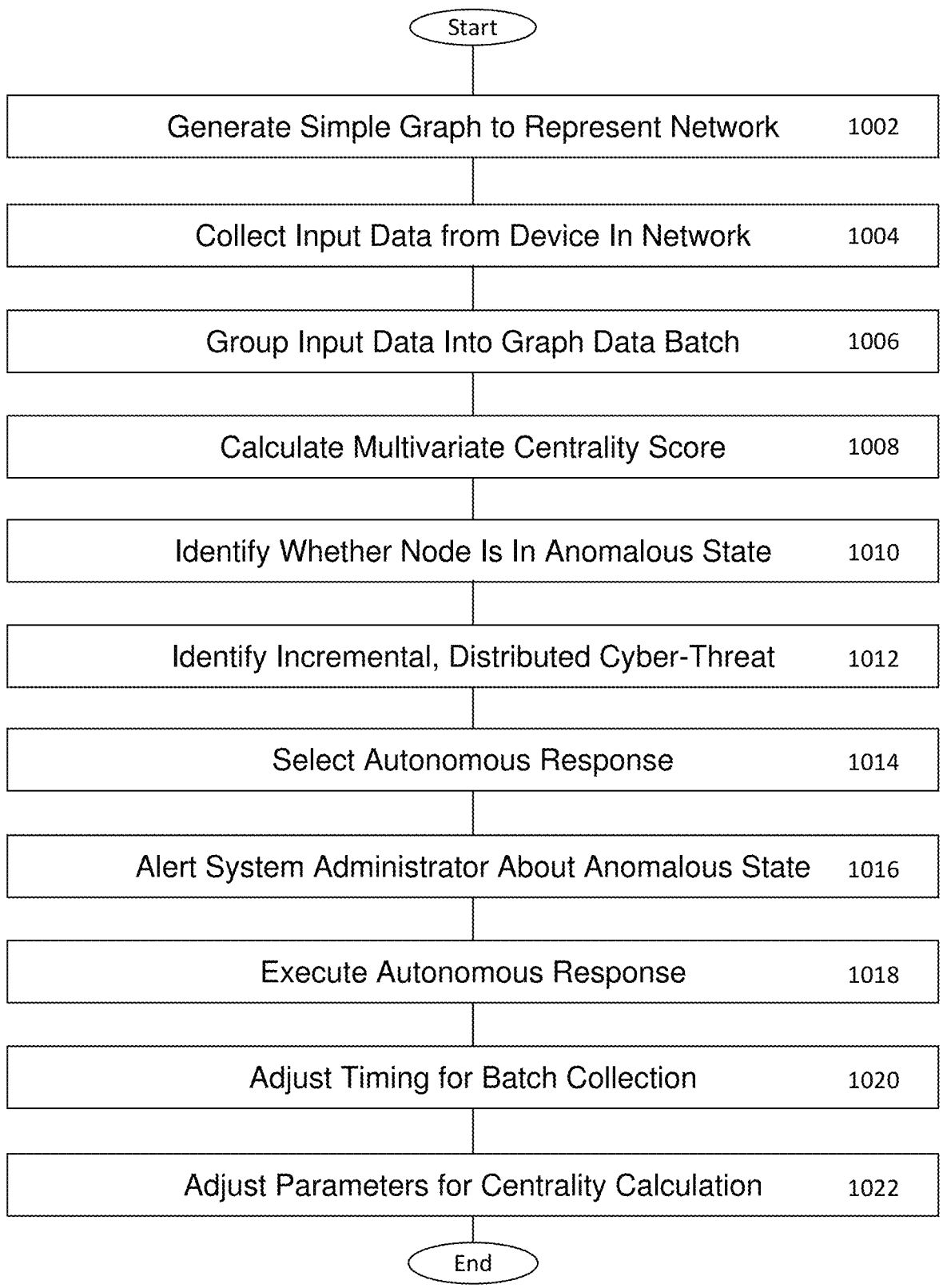
FIG. 10 illustrates a flowchart of an embodiment of a method for identifying a distributed, incremental attack.

FIG. 10 illustrates a flowchart of an embodiment of a method for identifying a distributed, incremental attack. The multivariate anomaly detector can have a graph detection module configured to generate a simple graph to represent the network (Block 1002). A node of the simple graph can represent the device in the network. An edge of the simple graph can represent a connection between devices in the network. One or more ports can connect to one or more probes, connectors, and/or other data input device or method, deployed to the network. The multivariate anomaly detector can have an ingestion module configured to collect, from one or more probes, connectors, and/or other data input device or method, monitoring the network, input data describing communication connections between devices in the network (Block 1004). The multivariate anomaly detector can have a batch module configured to group the input data from the ingestion module into a graph data batch based on a fixed batch increment of time to identify incremental actions (1006).

The multivariate anomaly detector can have a centrality processing module configured to calculate a multivariate centrality score for two or more nodes representing two or more devices based on the graph data batch describing device centrality to the network (1008). The multivariate centrality score uses a different heuristic for each variate of the multivariate centrality score. For example, the multivariate centrality score may have one variate be an eigenvector centrality score, a different variate be an access entropy score, and an additional variate be a network binding score. The multivariate anomaly detector may have an anomaly detector module configured to identify whether the two or more devices are in an anomalous state from normal device network interactions based on comparing the multivariate centrality score to a centrality score history to identify malicious activity distributed across multiple devices in the network (1010). The multivariate anomaly detector may have a cyber-threat module configured to identify a cyber-attack upon identifying incremental malicious actions distributed across multiple devices in the network (Block 1012).

The multivariate anomaly detector can have an autonomous response module configured to select an autonomous response based on the anomalous state (Block 1014). The multivariate anomaly detector can have a user interface module to alert a system administrator for the network about the anomalous state of the node indicating a distributed, incremental attack (Block 1016). The user interface module can generate a notification, such as the alert, about the cyber-attack using the incremental malicious actions distributed across multiple devices in the network. The alert can include a suggested autonomous response from the autonomous response module. The autonomous response module can execute the autonomous response if the system administrator does not respond within a given period (Block 1018). The graph detection module can adjust a batch increment of time for grouping the input data based on the identification of the anomalous state (Block 1020). The centrality processing module can adjust various parameters for the centrality score calculations based on the identification of the anomalous state (Block 1022).

Data Collection

The ingestion module can collect data from a summary connectivity metric that synthesizes connection data from device connectivity data about each device. The summary connectivity metric aggregates data transferred between pairs of devices from all ports and protocols, under the keys of "in", "out", and "size". The summary connectivity metric can be asymmetric when the data transfer is credited to the device that initiated the connection. The ingestion module can recognize the "size" of the connection, or the sum of incoming and outgoing data tin the transfer.

The batch module can store raw graph data under the key device identifiers. The batch module can group the input data into graph data batches demarcated by a fixed increment of time. The increment of time can be fixed to a sufficient length to identify malicious actions that may occur over a longer period of time. Additionally, the batch module can adjust the increment of time based on the resulting analysis of the anomaly detector. The device identifiers can reference further keys, such as the identifier of a device with which the current device has initiated a connection. These further keys may be a graph history array or a decaying variable.

At present, failed connections only influence the access entropy score, and then just the first time the failed connection is seen. The access entropy score is significant in this situation to identify a device that sends or receives very little data or has a very large number of partners in failed connections.

Figure 11:
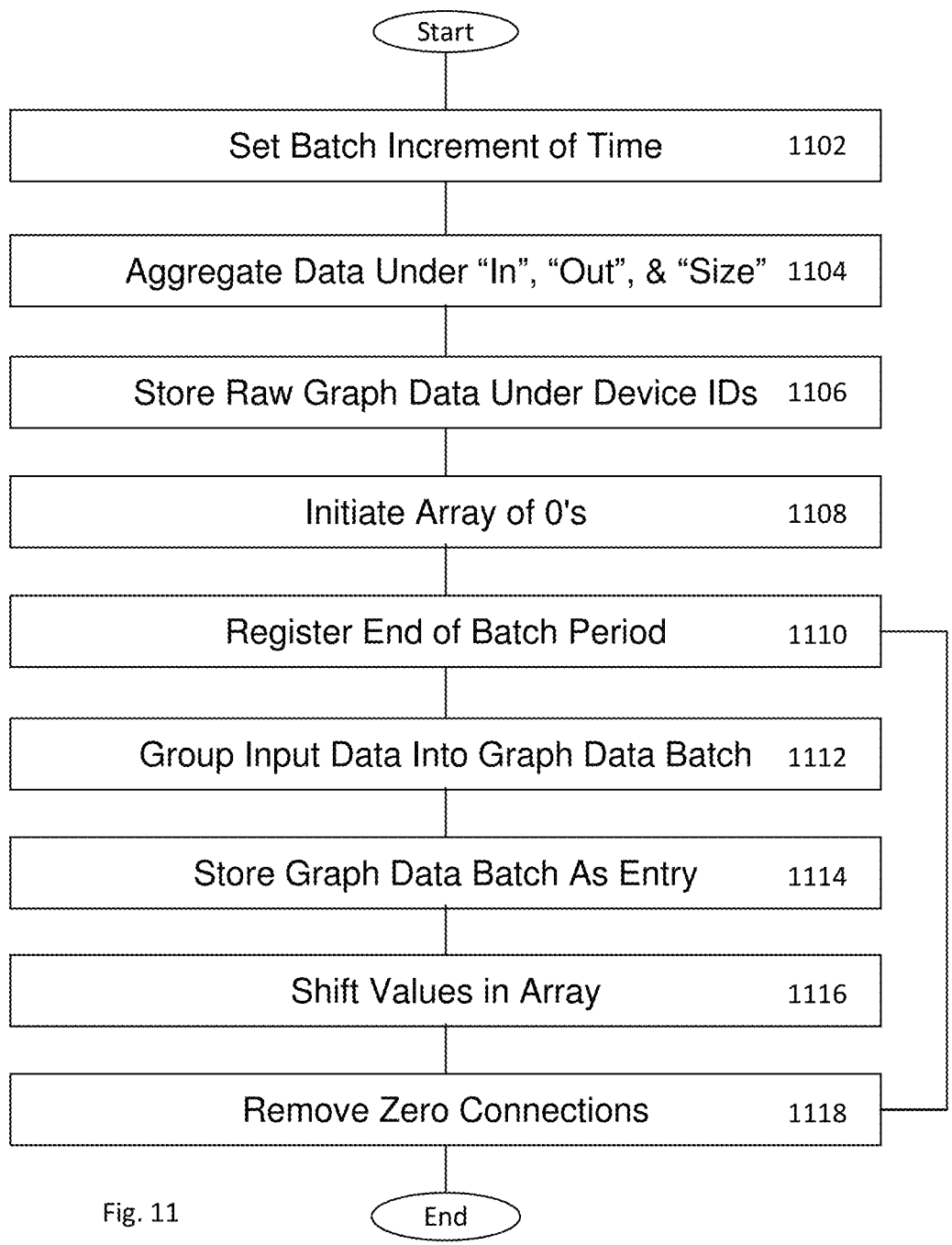
FIG. 11 illustrates a flowchart of an embodiment of a method for collecting a graph data batch in a graph history array.

FIG. 11 illustrates a flowchart of an embodiment of a method for collecting a graph data batch in a graph history array. The batch module can set a fixed batch increment of time for grouping the input data into a graph data batch (Block 1102). The batch module can aggregate the input data from the devices under the keys of "in", "out", and "size" (Block 1104). The batch module can store raw graph data describing device communications under the device identifier for that device (Block 1106). The batch module can initiate an array of zeros for each connection associated with the device identifier (Block 1108).

The batch module can register the end of a fixed batch increment of time (Block 1110). The batch module can group the input data into a graph data batch based on a fixed batch increment of time (Block 1112). The batch module can store the graph data batch as an entry in a graph history array (Block 1114). After the multivariate centrality score has been calculated, the batch module can shift each value in the graph history array over by one entry (Block 1116). The batch module can remove any connection that has a graph history array of zeros (Block 1118).

For a decaying variable, the batch module stores the graph history under each device identifier as a decaying variable. The batch module can add data to a running total. The batch module can multiply the decaying variable by a decay factor at the end of each centrality batch process, alleviating the use of long arrays. The batch module can remove connections from the history after the connections drop below a threshold value provided by the configuration file. The formula for the graph history value as a function of the batch step can be $$h(t+1)=h(t)\exp(-1/\tau)$$

where the time scale, with batches as the unit, $\tau$ is found in the configuration file. A benefit of using a long time scale is that some cycles in the time-series are likely to have a longer "wavelength" than a single fixed batch increment of time. The batch module can optimize, using machine learning, for the optimal timescale. The batch module can assess multiple decay scales to offer a range of time scales to scan for anomalies.

Figure 12:
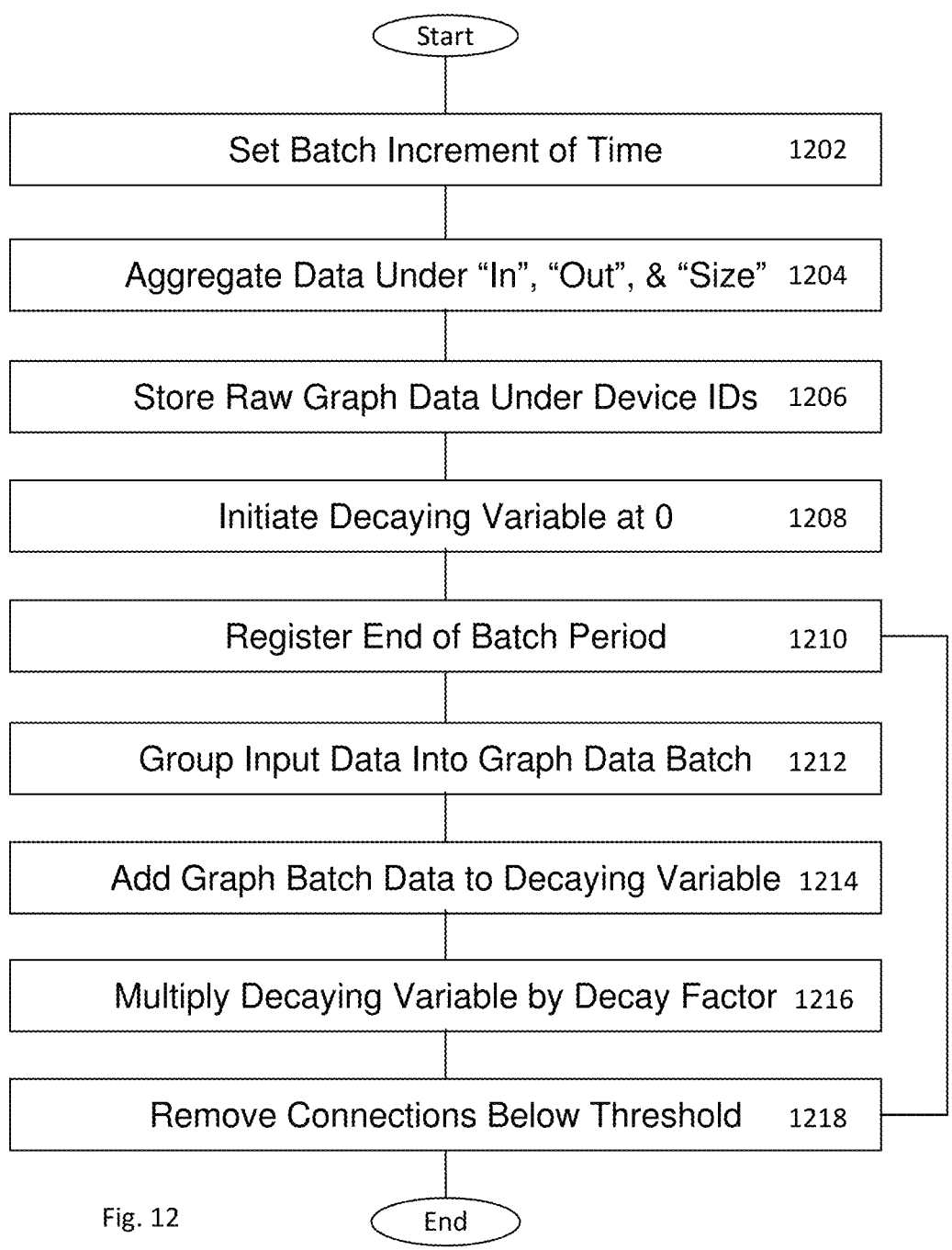
FIG. 12 illustrates a flowchart of an embodiment of a method for collecting a graph data batch in a decaying variable.

FIG. 12 illustrates a flowchart of an embodiment of a method for collecting a graph data batch in a decaying variable. The batch module can set a fixed batch increment of time for grouping the input data into a graph data batch (Block 1202). The batch module can aggregate the input data from the devices under the keys of "in", "out", and "size" (Block 1204). The batch module can store raw graph data describing device communications under the device identifier for that device (Block 1206). The batch module can initiate a decaying variable at zero for each connection associated with the device identifier (Block 1208).

The batch module can register the end of a fixed batch increment of time (Block 1210). The batch module can group the input data into a graph data batch based on a fixed batch increment of time (Block 1212). The batch module can add the graph data batch for the device to a decaying variable associated with the device identifier for the device (Block 1214). After the graph data batch collection, the batch module can multiply the decaying variable by a decay factor (Block 1216). The batch module can remove any connection that has a decay variable that drops below a threshold value provided by the configuration file (Block 1218).

Centrality Batch Process

The centrality processing module sums and processes the graph history from all devices into a weighted connection list for the network. Graph processing involves symmetrizing the graph and weighting the graph along each edge. 'Symmetrizing the graph' refers to adding the connection matrix to its transpose to construct an undirected, or symmetric, graph. Otherwise, the centrality processing module would consider four pure directed graphs, such as data in from received connections, data in from initiated connections, data out from received connections, data out from initiated connections, in addition to the graphs that are symmetric in one respect or the other. Additionally, eigenvector centrality vanishes for directed acyclic graphs. The motivation for the log scaling is, as the raw values are spread across many orders of magnitude, the centrality processing module may use that information without the largest raw values drowning out any other network or other numerical structure.

Once the graph is processed, the centrality processing module can begin computing centrality measures for each device. The centrality processing module may use multiple different types of centrality heuristics to compute centrality scores describing different aspects of the network, such as an eigenvector centrality score, an access entropy score, and a network binding score. By default, the centrality processing module can rescale each of the centrality scores before being reporting the centrality scores to the graph detection module. This rescaling sets a zero mean and unit standard deviation across the set of all devices on each batch. Rescaling can be switched off in the configuration file. Doing so would not change any existing history, nor is the rescaling generally invertible without knowing the original mean and standard deviation. The centralities before rescaling may be considered as "raw" and after rescaling as "rescaled".

Figure 13:
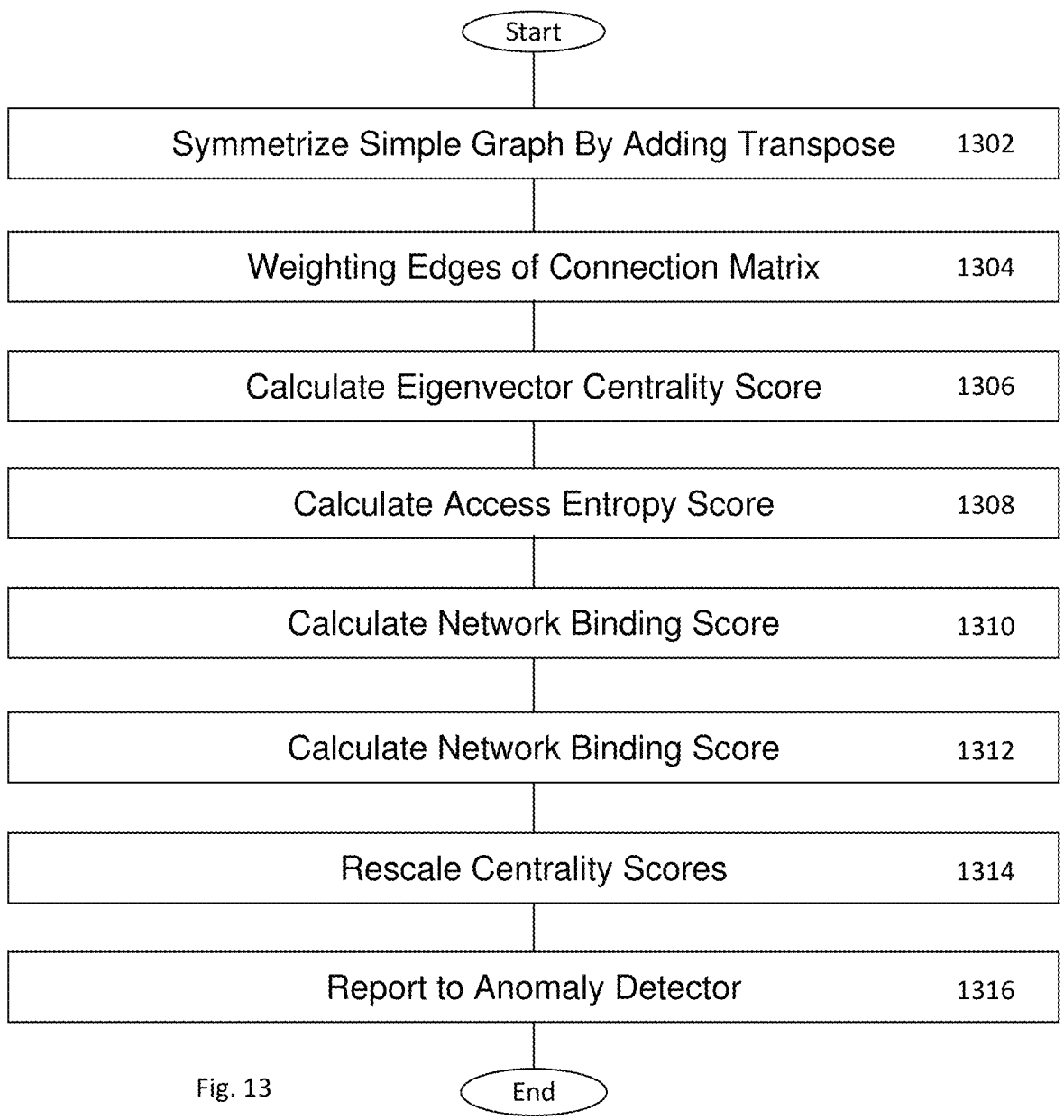
FIG. 13 illustrates a flowchart of an embodiment of a method for executing a centrality batch process.

FIG. 13 illustrates a flowchart of an embodiment of a method for executing a centrality batch process. The centrality processing module can symmetrize the simple graph by adding the connection matrix to a transpose of the connection matrix (Block 1302). The centrality processing module can weight each edge in the connection matrix with a logarithm of data transfers on that edge (Block 1304). The centrality processing module can use the graph data batch to calculate an eigenvector centrality score describing an influence of a node on the network by weighting connections to other influential nodes as a variate of the multivariate centrality score (Block 1306). The centrality processing module can use the graph data batch to calculate an access entropy score describing a diversity of visited nodes by a node as a variate of the multivariate centrality score (Block 1308). The centrality processing module can use a graph data batch to calculate a network binding score describing a connection density of a node with other nodes in the network as a variate of the multivariate centrality score (Block 1310). The centrality processing module can use one or more algorithms and sets of data to calculate other centrality scores (Block 1312). The centrality processing module can rescale each of the variates (Block 1314). The centrality processing module can then report the multivariate centrality scores to the anomaly detector module (Block 1316).

Eigenvector Centrality Score

Eigenvector centrality emphasizes as influential the nodes in a network that are connected to other influential nodes. The centrality processing module can generally represent the graph as a weighted connection matrix A. The centrality processing module can use a weighted connection list in place of the full connection matrix to save processing time and memory with minimal changes to the underlying calculations. The centrality processing module can represent the raw centralities as a vector v based on the "physical" devices, including virtual machines. Each component of vector v is a device with an allocated device identifier.

If the vector v were normalized using the least absolute deviations, referred to as L1 normalization, the vector v could be interpreted as a set of probabilities. For example, if the centrality processing module started with an ansatz, or initial, vector v of $(1, 0, 0, \ldots, 0)^T$, the set of probabilities p for an n-step random walk, starting from the first node and landing on each node, is $$p = \frac{1}{Z} A^n v$$

where Z is the L1 normalization factor. Alternately, the centrality processing module can normalize the vector v using least squares normalization, referred to as L2 normalization. L2 normalization returns a unit vector in the usual sense, but with just a difference in scale factor. Starting with a positive definite ansatz for the set of centralities, such as an ansatz vector v of $(1, 1, \ldots, 1)^T$, the limit of an infinite random walk converges to the eigenvector of the connection matrix whose corresponding eigenvalue has the largest absolute value. The speed of the convergence depends on the separation in absolute value between the leading eigenvalue and the next eigenvalue. As this may typically be a big separation, the convergence is usually fast.

In the current implementation, the centrality processing module can add the connection matrix to a multiple of the identity, as established in a configuration file. This transformation does not change the eigenvectors, but does add the coefficient of the identity to the eigenvalues to give preference to the more positive eigenvalues. Typically, this transformation speeds up convergence.

The centrality processing module may use an initial ansatz of a complete array of ones. The centrality processing module can replace the initial ansatz vector by the previous batch's raw eigenvector centralities in subsequent batches.

Figure 14:
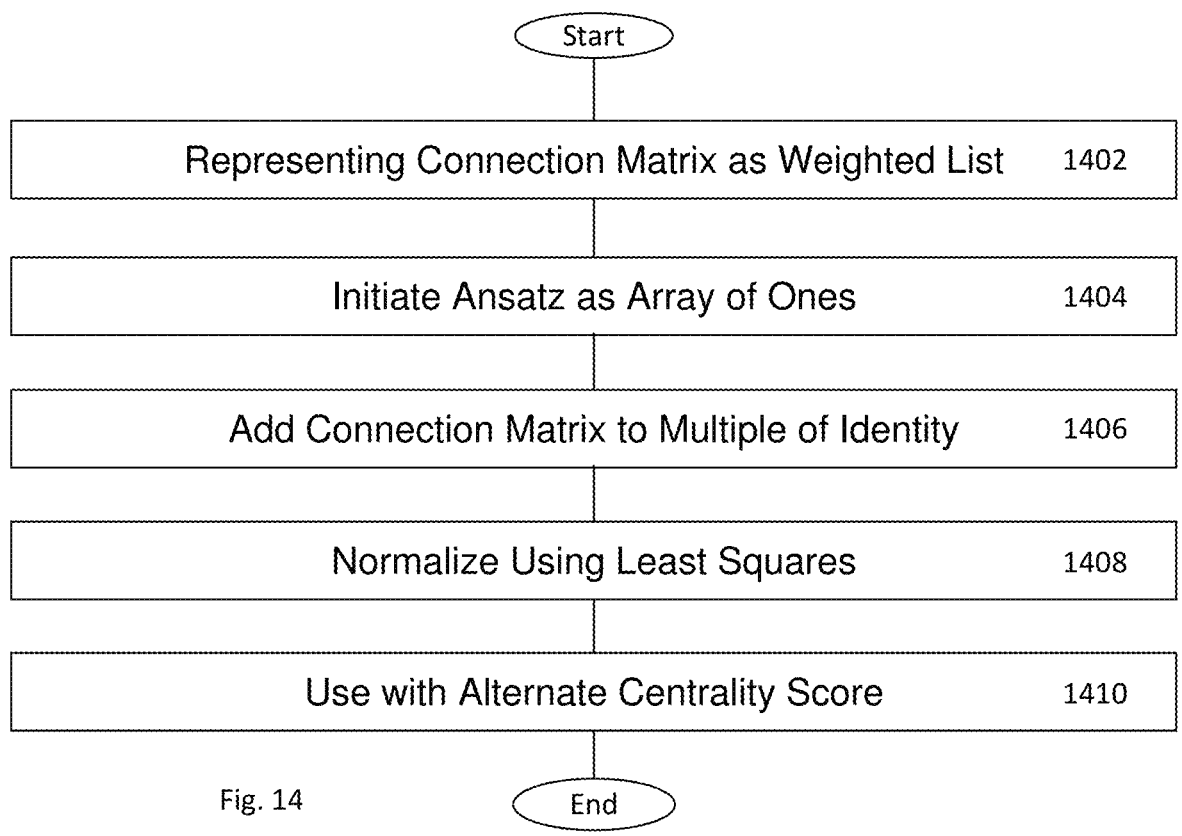
FIG. 14 illustrates a flowchart of an embodiment of a method for computing an eigenvector centrality score.

FIG. 14 illustrates a flowchart of an embodiment of a method for computing an eigenvector centrality score. The centrality processing module can represent the connection matrix as a weighted connection list to speed calculations (Block 1402). The centrality processing module can initiate the communication vector as an ansatz vector as an array of ones (Block 1404). The centrality processing module can add a connection matrix describing the simple graph to a multiple of an identity matrix to give preference to positive eigenvectors (Block 1406). The centrality processing module can normalize the vector of communication data using least squares normalization to converge on the eigenvalues (Block 1408). The centrality processing module can use the eigenvector centrality score with an alternate centrality score using an alternate centrality heuristic to compute a matrix of two-point correlations between the eigenvector centrality score and the alternate centrality score to identify the anomalous state (Block 1410). An anomaly detector can identify whether two or more devices are in an anomalous state from normal device network interactions based on comparing the eigenvector centrality score to an eigenvector centrality score history to identify malicious activity distributed across multiple devices in the network (Block 1412).

Access Entropy Score

An "accessibility" metric provides an alternative approach to determining the centrality of a node in a system. The accessibility of a node measures the number of other nodes that node can reach. This has an advantage over eigenvector centrality in highlighting less connected, yet highly influential nodes. Accessibility considers self-avoiding random walks from a given node. For example, let the probability of a self-avoiding random walk of length n from node i reaching a node j be $p_j(i,n)$. Also, let the set of all nodes on the network be J. The accessibility of node i at order n is then $$A_n(i) = \Sigma_{j \in J} - p_j(i,n) \log(p_j(i,n)).$$

Although the network is sparse, the variance in order centrality, referring to edges connected to each node, is typically large. The result is that these calculations become expensive if two highly connected nodes are also connected to each other. For this reason, an access entropy value computes the entropy of immediate, symmetrized connections to and from each device. Thus, the complexity scales linearly in the total number of connections, just like eigenvector centrality. Because some connections were observed to have zero weight, representing failed connections, the centrality processing module adds a configurable bonus value onto every connection to perturb the connection value away from zero. Adding the configurable bonus value allows the centrality processing module to detect cases where many connections are being attempted to or from otherwise inactive devices. An example case could be a sudden increase in failed connections, low-data connections, or both would count as an anomaly, possibly indicating low-profile attempts to crawl the network. An access entropy score sensitive to immediate connections can provide a local viewpoint to the centrality computations. However, unlike network topology, an access entropy score counts connections initiated by either party because of the symmetrized graph, opening up more general kinds of anomaly.

Figure 15:
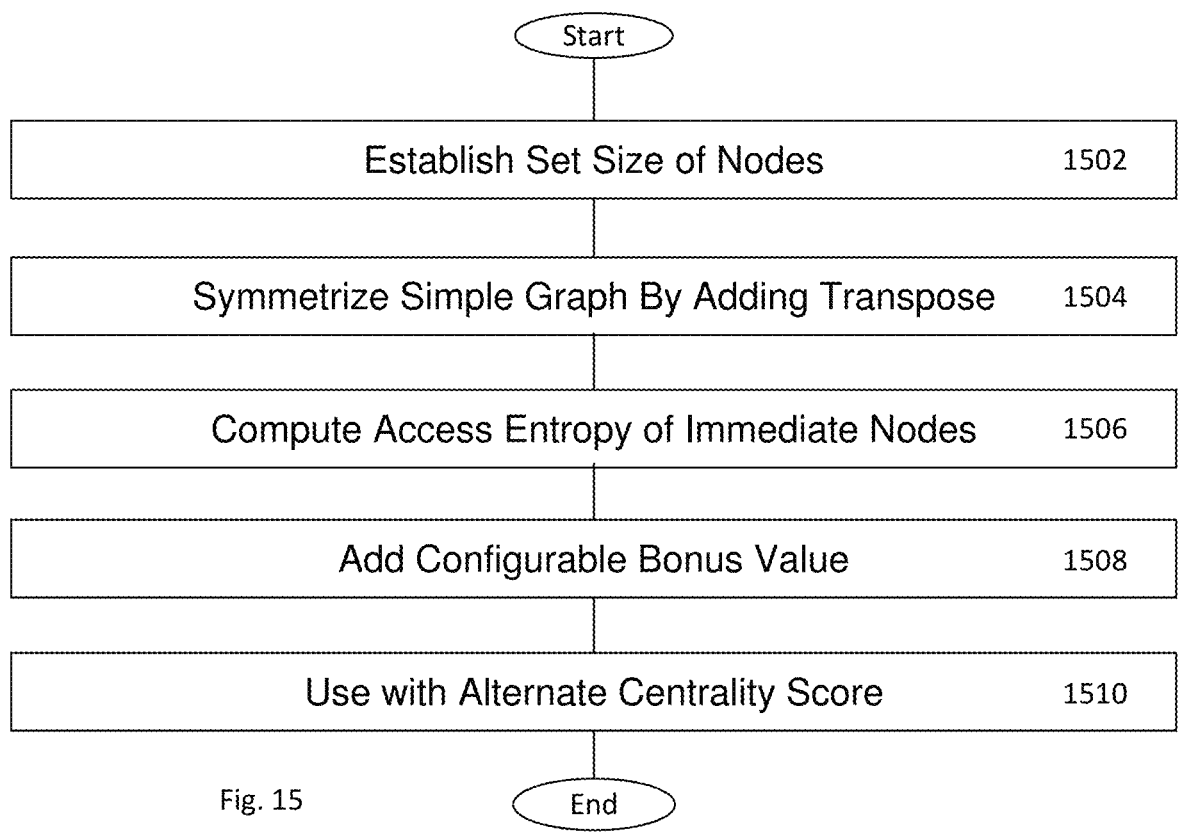
FIG. 15 illustrates a flowchart of an embodiment of a method for computing an access entropy score.

FIG. 15 illustrates a flowchart of an embodiment of a method for computing an access entropy score. The centrality processing module can establish the set size of the nodes in the network (Block 1502). The centrality processing module can symmetrize the simple graph by adding the connection matrix to a transpose of the connection matrix (Block 1504). The centrality processing module can compute the access entropy score of the immediate nodes for each node in the network (Block 1506). The centrality processing module can add a configurable bonus onto every connection value to perturb the connection value away from zero (Block 1508). The centrality processing module can use the access entropy score with an alternate centrality score using an alternate centrality heuristic to compute a matrix of two-point correlations between the access entropy score and the alternate centrality score to identify the anomalous state (Block 1510). An anomaly detector can identify whether two or more devices are in an anomalous state from normal device network interactions based on comparing the access entropy score to an access entropy score history to identify malicious activity distributed across multiple devices in the network (Block 1512).

Network Binding Score

A network binding score applies the principles of statistical physics, particularly condensed matter physics of disordered systems, to a network to identify the centrality of individual nodes. The network binding score provides a centrality metric that can be interpreted as a connection density in the neighborhood of the node.

Conversely, a network binding score does not suffer from these drawbacks. The network binding score scales linearly in total number of connections. The network binding score gives analogue values between 0 and 1 that are typically spread across that range. The network binding score makes use of the connection weights. The network binding models the network as a glass, or a disordered system covering both a structural and a "spin" glass. A "spin" can be thought of as a discrete magnetic dipole that can point "up" or "down". Direct interactions between dipoles are strictly "nearest neighbor", but correlations can exist over much longer distances. Hamiltonian mechanics can be used to describe the energy H of the system as thus:

$$H(J) = -\sum_{i,j \in J}(A_{ij}s_i s_j)$$

where $A_{ij}$ is the connection matrix, $s_i \in \{+1, -1\}$ is the 'spin' state of node, i and $s_j \in \{+1, -1\}$ is the 'spin' state of node j. An intuitive way to look at this is that spins "like" to take the same direction as their neighbors if the "couplings" are positive. This action is an example of "ferromagnetism". If the couplings were negative, the couplings have "antiferromagnetism", with spins "like" to take the opposite value to their neighbors. Thus, a 'weighted order centrality' for a device i can be defined as:

$$W_i = \sum_j A_{ij}$$

The energy H can be split into a sum over contributions for each node:

$$H_i(J) = -\sum_{j \in J}(A_{ij}s_i s_j)$$

such that the equation reads:

$$H(J) = \sum_{i \in J} H_i(J)$$

Now suppose that this system is thermally connected to a heat bath at temperature T, such that energy may be transferred between the network and the bath, referred to in thermodynamics as the "canonical ensemble". In these algorithms, temperature is simply a statistical parameter with a sensible, chosen default value. Higher temperatures encourage lower network binding scores. The raw scores are bounded at both ends. A sensible temperature choice is then one that encourages an even spread of scores. Since the system is simulated in canonical ensemble, the energy H becomes time-dependent, so that energy can enter or leave the system, as shown by:

$$H(t, J) = -\sum_{i,j \in J}(A_{ij}\langle s_i(t)s_j(t)\rangle)$$

For algorithmic simplicity, spin designations $\langle s_i(t)s_j(t)\rangle$ are replaced with $\langle s_i(t)\rangle \langle s_j(t)\rangle$. At time 0, the centrality processing module can assign a spin value of +1 to all the nodes. At subsequent times t, the spins have values with probability $p_i(t,\pm 1)$. For a spin state $s_i \in \{+1, -1\}$, the probability is:

$$p_i(t+1, s) = \frac{1}{Z_i(t)}\exp(-\beta H_i(t, J))$$

where $Z_i(t)$ is the least absolute deviations normalization and $\beta$ is $1/(\langle W_i \rangle T)$. In the thermodynamic analogy, the mean weighted order centrality $\langle W_i \rangle$ plays the part of the Boltzmann constant, which relates temperatures to energy scales.

The centrality processing module can store the probabilities and propagate them forward. Eventually the centrality processing module can compute the square of the mean value of the spin for each node between a start time and an end time. Doing an "exact" computation is more reliable and faster. The centrality processing module then squares the mean spin value. A raw score of '1' indicates strong binding, and '0' indicates weak binding. The start time and end time are selected to avoid early outliers and provide a decent level of non-locality without reaching equilibrium.

The centrality processing module can compute the square of the mean value of the spin $\langle s_i \rangle^2$. The centrality processing module may also compute the spin variance $\langle s_i^2 \rangle - \langle s_i \rangle^2$.

Figure 16:
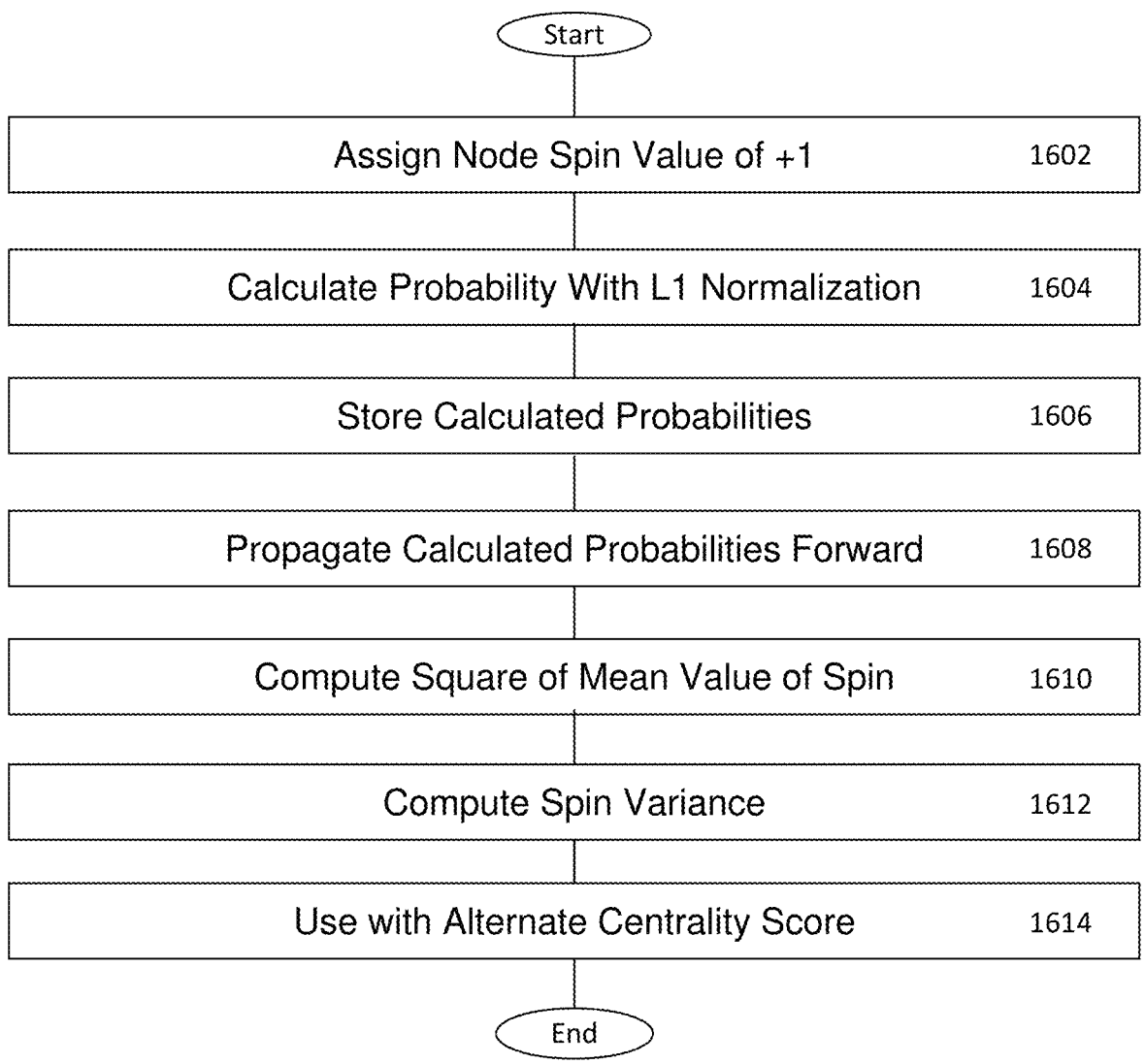
FIG. 16 illustrates a flowchart of an embodiment of a method for computing a network binding score.

FIG. 16 illustrates a flowchart of an embodiment of a method for computing a network binding score. The centrality processing module can assign a spin value of +1 to all the nodes (Block 1602). The centrality processing module can calculate a probability for spin for each node, factoring in an absolute least deviation normalization, or L1 normalization (Block 1604). The centrality processing module can store the calculated probabilities for spin of each node (Block 1606). The centrality processing module can propagate the calculated probabilities forward to each node in the network (Block 1608). The centrality processing module can compute a square of the mean value of the spin for each node between a given start time and an end time, such as the fixed batch increment of time (Block 1610). The centrality processing module can optionally compute a spin variance for each node between the start time and the end time (Block 1612). The centrality processing module can use the network binding score with an alternate centrality score using an alternate centrality heuristic to compute a matrix of two-point correlations between the network binding score and the alternate centrality score to identify the anomalous state (Block 1614). An anomaly detector can identify whether two or more devices are in an anomalous state from normal device network interactions based on comparing the network binding score to a network binding score history to identify malicious activity distributed across multiple devices in the network (Block 1616).

Anomaly Detection

Early centrality results are observed to jump occasionally and then settle down into a new centrality value. To ensure that the anomaly detector module only treats the initial jump as anomalous and the subsequent settling down as normal, the values considered by the anomaly prediction are the changes in centrality at each step. The anomaly detector module rescales these values using the historical mean and standard deviation for each centrality measure for each device. For example, the anomaly detector module rescales these values based on the usual drift for that device. More precisely, the anomaly detector module stores, for device i, a historical record for a centrality metric $c_i(t)$ as a function of time t. Changes in the centrality are represented by $d_i(t)=c_i(t)-c_i(t-1)$. This history has a mean value $\mu_i = \langle d_i(t) \rangle$ and a standard deviation $\sigma_i = \sqrt{\langle (d_i(t) - \mu_i)^2 \rangle}$ The rescaled change in centrality can then be represented by:

$$\tilde{d}_i(t) = \frac{d_i(t) - \mu_i}{\sigma_i}.$$

The anomaly detector module can store previous centrality measures. The anomaly detector only computes anomalies once the history has reached an appropriate length, referred to as a maturation period. Accommodation is made for the possibility that some centrality metrics may have longer histories than others, so that only centralities with enough history are used. Since centrality metrics are usually positively correlated, this uncertainty propagation would be incorrect. Instead, the anomaly detector module can compute a matrix of 2-point correlations between 1 and −1 between the centralities. Let the indices a, b correspond to different centrality measures on a given device and let the change in centrality a be $d_a(t)$ with mean $\mu_a$ and standard deviation $\sigma_a$. The 2-point correlation matrix is represented by:

$$C_{ab} = \frac{1}{\sigma_a \sigma_b} \langle (d_a(t) - \mu_a)(d_b(t) - \mu_b) \rangle$$

In principle, some standard deviations $\sigma_a$ may be zero, or at least very small. To control this divergence, a small "regularization" constant is added $\sigma_a \rightarrow \sigma_a + \epsilon$, where $\epsilon$ is set in a configuration file. The inverse of that matrix is effectively a metric tensor that can be used to calculate squared distances in anomaly space. To avoid this matrix having zero determinant, a regularization method can be employed. For example, the anomaly detector module can add a small value to the diagonals to ensure that the determinant is always greater than zero, even if only slightly. The anomaly detector can use the value $\epsilon^{1/n}$, where n is the number of centralities used. The off-diagonals are correspondingly shrunk by multiplying by a factor of $(1-\epsilon^{1/n}/(n-1))$. The result is that ordinarily singular cases of strong anti-correlation become cases of strong, but bounded, sensitivity to deviations from that anti-correlation. This approach has the advantage over a pseudo-inverse, which loses that sensitivity to deviations from the anti-correlation upon approaching the singular case. Loss of sensitivity is undesirable for anomaly detection.

The anomaly detector module can feed the resulting anomaly radius into a probabilisitic distribution, such as but not limited to, a one-tail, multivariate Cauchy distribution. The anomaly detector module computes the survival probability as the chance that this result or stranger would occur in the null hypothesis. The null hypothesis corresponds to the system behaving as normal. The anomaly detector module predicts the anomaly as minus the log of this probability.

Non-zero anomaly predictions are made if the "predict" flag in the state is "True". The centrality processing module toggles the flag to True upon updating the history. The anomaly detector module toggles the flag back to False after a prediction has been made. This flag system works with the existing detector infrastructure, which reports anomalies every minute because other detectors do not need a batch process to complete before predicting anomalies. If the flag is set to False, anomaly strengths and metric importances are reported as zero.

Figure 17:
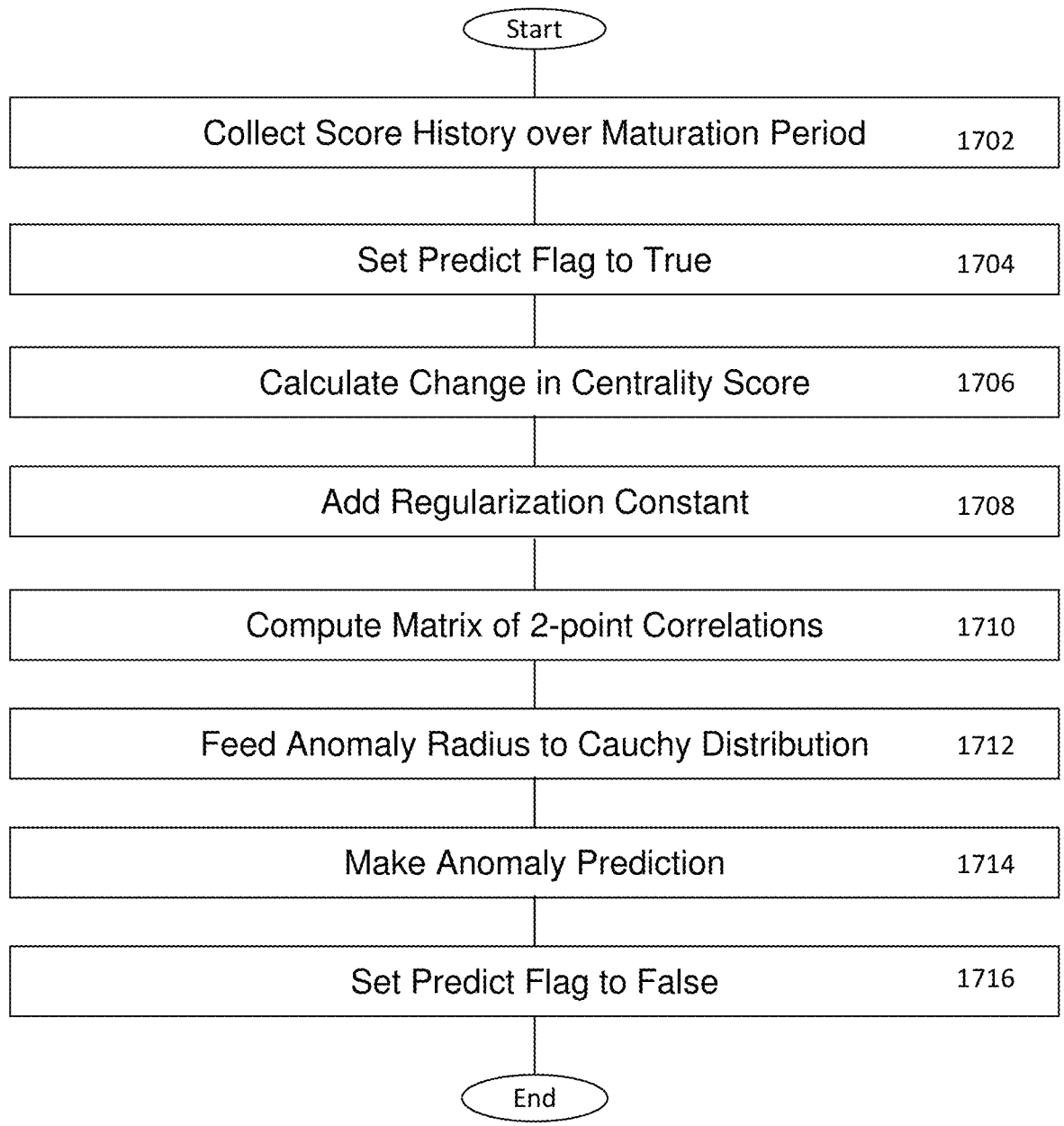
FIG. 17 illustrates a flowchart of an embodiment of a method for detecting an anomalous state.

FIG. 17 illustrates a flowchart of an embodiment of a method for detecting an anomalous state. The anomaly detector module can collect a centrality score history over a maturation period for each variate of the multivariate centrality score (Block 1702). The centrality processing module can set the predict flag to True upon completion of the centrality batch process (Block 1704). The anomaly detector module can calculate a change for each variate of the multivariate centrality score (Block 1706). The anomaly detector module can add a small regularization constant to the standard deviations of the variates of the multivariate centrality scores (Block 1708). The anomaly detector module can compute a matrix of two-point correlations between each variate of the multivariate centrality score (Block

1710). The anomaly detector module can feed an anomaly radius for the multivariate centrality score into a one-tail Cauchy distribution to compute a survival probability (Block 1712). The anomaly detector module can predict the anomaly as minus the log of the survival probability (Block 1714). The anomaly detector module can set the predict flag to False (Block 1716).

Web Site

The web site is configured as a browser-based tool or direct cooperating app tool for configuring, analyzing, and communicating with the cyber threat defense system.

Network

A number of electronic systems and devices can communicate with each other in a network environment. FIG. 18 illustrates in a simplified diagram a networked environment. The network environment has a communications network. The network can include one or more networks selected from an optical network, a cellular network, the Internet, a Local Area Network ("LAN"), a Wide Area Network ("WAN"), a satellite network, a $3^{rd}$ party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

At least one or more client computing systems for example, a mobile computing device (e.g., smartphone with an Android-based operating system) can communicate with the server(s). Each of the one or more client computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design can be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. A module's functionality can be combined into another module as well as can be split into multiple modules.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A method for a cyber threat defense system, comprising:
    detecting a cyber-attack using incremental malicious actions distributed across multiple devices in a network;
    collecting input data describing communication connections between devices in the network;
    grouping the input data into a graph data batch based on a fixed batch increment of time to identify incremental actions;
    calculating a multivariate centrality score for two or more devices based on the graph data batch describing device centrality to the network;
    identifying whether the two or more devices are in an anomalous state from normal device network interactions based on the multivariate centrality score in order to identify the malicious activity distributed across multiple devices in the network; and
    generating a notification about the cyber-attack using the incremental malicious actions distributed across multiple devices in the network.

2. The method for the cyber threat defense system of claim 1, further comprising:
    comparing the multivariate centrality score to a multivariate centrality score history to identify the malicious activity distributed across multiple devices in the network.

3. The method for the cyber threat defense system of claim 1, further comprising:
    generating a graph with nodes to represent devices in the network and edges of the graph to represent connections between the devices in the network.

4. The method for the cyber threat defense system of claim 3, further comprising:
  calculating the multivariate centrality score for two or more nodes representing two or more devices based on the graph data batch describing device centrality to the network using a different heuristic for each variate of the multivariate centrality score in order to identify at least a first node and a second node both acting in the anomalous state from the normal device network interactions.

5. The method for the cyber threat defense system of claim 1, further comprising:
  using the graph data batch to calculate a network binding score describing a connection density of a first node with other nodes in the network as a variate of the multivariate centrality score.

6. The method for the cyber threat defense system of claim 1, further comprising:
  using the graph data batch to calculate an eigenvector centrality score describing an influence of a first node on the network by weighting connections to other influential nodes as a variate of the multivariate centrality score.

7. The method for the cyber threat defense system of claim 1, further comprising:
  collecting a score history over a maturation period for each variate of the multivariate centrality score.

8. The method for the cyber threat defense system of claim 1, further comprising:
  computing a matrix of two-point correlations between each variate of the multivariate centrality score.

9. The method for the cyber threat defense system of claim 1, further comprising:
  using the graph data batch to calculate an access entropy score describing a diversity of visited nodes by a first node as a variate of the multivariate centrality score.

10. A non-transitory computer readable medium comprising computer readable code operable, when executed by one or more processing apparatuses in the cyber threat defense system to instruct a computing device to perform the method of claim 1.

11. A multivariate anomaly detector, comprising:
  a cyber-threat module configured to detect a cyber-attack using incremental malicious actions distributed across multiple devices in a network;
  an ingestion module configured to collect input data describing communication connections between devices in the network;
  a batch module configured to group the input data from the ingestion module into a graph data batch based on a fixed batch increment of time to identify incremental actions;
  a centrality processing module configured to calculate a multivariate centrality score for two or more devices based on the graph data batch describing device centrality to the network from the batch module;
  an anomaly detector module configured to identify whether the two or more devices are in an anomalous state from normal device network interactions based on the multivariate centrality score in order to identify the malicious activity distributed across multiple devices in the network; and
  a user interface module to generate a notification about the cyber-attack using the incremental malicious actions distributed across multiple devices in the network.

12. The multivariate anomaly detector of claim 11, wherein the anomaly detector module is further configured to compare the multivariate centrality score to a multivariate centrality score history to identify the malicious activity distributed across multiple devices in the network.

13. The multivariate anomaly detector of claim 11, further comprising:
  a graph detection module configured to generate a graph with nodes to represent devices in the network and edges of the graph to represent connections between the devices in the network.

14. The multivariate anomaly detector of claim 13, wherein the centrality processing module is further configured to calculate the multivariate centrality score for two or more nodes representing two or more devices based on the graph data batch describing device centrality to the network using a different heuristic for each variate of the multivariate centrality score in order to identify at least a first node and a second node both acting in the anomalous state from the normal device network interactions.

15. The multivariate anomaly detector of claim 11, wherein the centrality processing module is further configured use the graph data batch to calculate a network binding score describing a connection density of a first node with other nodes in the network as a variate of the multivariate centrality score.

16. The multivariate anomaly detector of claim 11, wherein the centrality processing module is further configured to use the graph data batch to calculate an eigenvector centrality score describing an influence of a first node on the network by weighting connections to other influential nodes as a variate of the multivariate centrality score.

17. The multivariate anomaly detector of claim 11, wherein the anomaly detector module is further configured to collect a score history over a maturation period for each variate of the multivariate centrality score.

18. The multivariate anomaly detector of claim 11, wherein the anomaly detector module is further configured to compute a matrix of two-point correlations between each variate of the multivariate centrality score.

19. The multivariate anomaly detector of claim 11, wherein the anomaly detector module is further configured to feed an anomaly radius for the multivariate centrality score into a probabilistic distribution such as a one-tail Cauchy distribution to compute a survival probability.

20. The multivariate anomaly detector of claim 11, wherein the centrality processing module is configured use the graph data batch to calculate an access entropy score describing a diversity of visited nodes by a first node as a variate of the multivariate centrality score.

* * * * *